United States Patent
Ueda et al.

(10) Patent No.: US 8,503,035 B2
(45) Date of Patent: *Aug. 6, 2013

(54) IMAGE FORMING APPARATUS AND IMAGE FORMING SYSTEM

(75) Inventors: Masashi Ueda, Nagoya (JP); Ryuji Yamada, Ogaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 578 days.

This patent is subject to a terminal disclaimer.

(21) Appl. No.: 12/551,306

(22) Filed: Aug. 31, 2009

(65) Prior Publication Data

US 2010/0053686 A1    Mar. 4, 2010

(30) Foreign Application Priority Data

Sep. 1, 2008    (JP) ................................. 2008-223176

(51) Int. Cl.
     *H04N 1/405*      (2006.01)
(52) U.S. Cl.
     USPC ......................................... 358/3.13; 358/534
(58) Field of Classification Search
     None
     See application file for complete search history.

(56) References Cited

U.S. PATENT DOCUMENTS

| | | | | | |
|---|---|---|---|---|---|
| 5,396,607 | A | * | 3/1995 | Shimatani | ...................... 711/219 |
| 5,917,529 | A | * | 6/1999 | Hotta et al. | ..................... 347/129 |
| 6,317,220 | B1 | * | 11/2001 | Fujita et al. | ................... 358/3.12 |
| 6,369,912 | B1 | * | 4/2002 | Kumashiro | ..................... 358/1.9 |
| 6,762,779 | B2 | * | 7/2004 | Kurosu et al. | ................. 347/129 |
| 2004/0155916 | A1 | | 8/2004 | Uchiyama et al. | |
| 2010/0053654 | A1 | | 3/2010 | Ueda et al. | |

FOREIGN PATENT DOCUMENTS

| | | |
|---|---|---|
| CN | 1082196 C | 4/2002 |
| JP | H04-284062 A | 10/1992 |
| JP | H09-123540 A | 5/1997 |
| JP | 2618107 B2 | 6/1997 |

(Continued)

OTHER PUBLICATIONS

Japan Patent Office, Notice of Reasons for Rejection for Japanese Patent Application No. 2008-223176, mailed Jan. 18, 2011.

(Continued)

*Primary Examiner* — Twyler Haskins
*Assistant Examiner* — Helen Q Zong
(74) *Attorney, Agent, or Firm* — Baker Botts L.L.P.

(57) ABSTRACT

An image forming apparatus comprises an image data generating unit configured to convert a tone of an input value which indicates a density of a pixel by using a predetermined dither matrix and generate image data. The image forming apparatus further comprises a drive source and a gear configured to transmit a drive force from the drive source to an image carrier. The dither matrix includes a plurality of sub-matrixes arranged in a predetermined rule and a dot in each of the plurality of the sub-matrixes grows from a corresponding original point. The image forming apparatus satisfies a relation of (1) a≧0.08 mm and b/a<0.80, or (2) a<0.08 mm and b/a>1.27, where "a" is a travel distance of a printing medium per tooth of the gear in a secondary scanning direction orthogonal to the primary scanning direction, and "b" is a distance between the corresponding original points of a pair of the dots formed on the printing medium apart from each other in the secondary scanning direction on the basis of a pair of the sub-matrixes adjacent to each other in the primary scanning direction in the dither matrix.

8 Claims, 19 Drawing Sheets

FOREIGN PATENT DOCUMENTS

| | | |
|---|---|---|
| JP | H09-166897 A | 6/1997 |
| JP | H10-166658 A | 6/1998 |
| JP | H11-215376 A | 8/1999 |
| JP | 2002-118746 A | 4/2002 |
| JP | 2003-215976 A | 7/2003 |
| JP | 2004-247884 A | 9/2004 |

OTHER PUBLICATIONS

Japan Patent Office, Decision to Grant a Patent for Japanese Patent Application No. 2008-223176, mailed Apr. 26, 2011.

The State Intellectual Property Office of the People'S Republic of China, Notification of First Office Action for Chinese Patent Application No. 200910170656.7, issued Aug. 26, 2011.

Japan Patent Office, Notice of Reasons for Rejection for Patent Application No. JP 2008-223176, mailed Oct. 19, 2010.

The State Intellectual Property Office of the Peoples Republic of China, Notification of the Second Office Action for Chinese Patent Application No. 200910170656.7, issued Jun. 27, 2012.

Patent Office of the People's Republic of China, Decision on Rejection for Chinese Patent Application No. 200910170656.7 (counterpart Chinese patent application), issued Mar. 28, 2013.

* cited by examiner

Fig.12

| PAT No. | LINES (lpi) | ANGLE (degree) | LINE PITCH (dots) | GEAR PITCH a (mm) | | | | | | | | | | | | | |
|---|---|---|---|---|---|---|---|---|---|---|---|---|---|---|---|---|---|
| | | | | 0.05 | 0.08 | 0.1 | 0.12 | 0.16 | 0.24 | 0.32 | 0.4 | 0.48 | 0.53 | 0.62 | 0.9 | 1.8 | 2.86 |
| 1 | 190 | 18 | 1 | 0.846666667 NG | 0.529166667 GOOD | 0.423333333 GOOD | 0.352777778 GOOD | 0.264583333 GOOD | 0.176388889 GOOD | 0.132291667 GOOD | 0.105833333 GOOD | 0.086394558 GOOD | 0.079874214 GOOD | 0.06827957 GOOD | 0.047037037 GOOD | 0.023518519 GOOD | 0.014801865 GOOD |
| 2 | 190 | 72 | 1 | 0.846666667 NG | 0.529166667 GOOD | 0.423333333 GOOD | 0.352777778 GOOD | 0.264583333 GOOD | 0.176388889 GOOD | 0.132291667 GOOD | 0.105833333 GOOD | 0.086394558 GOOD | 0.079874214 GOOD | 0.06827957 GOOD | 0.047037037 GOOD | 0.023518519 GOOD | 0.014801865 GOOD |
| 3 | 145 | 14 | 1 | 0.846666667 NG | 0.529166667 GOOD | 0.423333333 GOOD | 0.352777778 GOOD | 0.264583333 GOOD | 0.176388889 GOOD | 0.132291667 GOOD | 0.105833333 GOOD | 0.086394558 GOOD | 0.079874214 GOOD | 0.06827957 GOOD | 0.047037037 GOOD | 0.023518519 GOOD | 0.014801865 GOOD |
| 4 | 137 | 76 | 2 | 1.693333333 GOOD | 1.058333333 NG | 0.846666667 NG | 0.705555556 GOOD | 0.529166667 GOOD | 0.352777778 GOOD | 0.264583333 GOOD | 0.211666667 GOOD | 0.172789116 GOOD | 0.159748428 GOOD | 0.13655914 GOOD | 0.094074074 GOOD | 0.047037037 GOOD | 0.029603373 GOOD |
| 5 | 172 | 18.4 | 1 | 0.846666667 NG | 0.529166667 GOOD | 0.423333333 GOOD | 0.352777778 GOOD | 0.264583333 GOOD | 0.176388889 GOOD | 0.132291667 GOOD | 0.105833333 GOOD | 0.086394558 GOOD | 0.079874214 GOOD | 0.06827957 GOOD | 0.047037037 GOOD | 0.023518519 GOOD | 0.014801865 GOOD |
| 6 | 137 | 14 | 1 | 0.846666667 NG | 0.529166667 GOOD | 0.423333333 GOOD | 0.352777778 GOOD | 0.264583333 GOOD | 0.176388889 GOOD | 0.132291667 GOOD | 0.105833333 GOOD | 0.086394558 GOOD | 0.079874214 GOOD | 0.06827957 GOOD | 0.047037037 GOOD | 0.023518519 GOOD | 0.014801865 GOOD |

IMAGE FORMING APPARATUS AND IMAGE FORMING SYSTEM

CROSS REFERENCE TO RELATED APPLICATION

This application claims priority to and the benefit of Japanese Patent Application No. 2008-223176, filed Sep. 1, 2008, the entire subject matter and disclosure of which is incorporated herein by reference.

BACKGROUND

1. Technical Field

The present invention relates to an image forming apparatus and an image forming system which performs halftoning by using a dither matrix.

2. Description of the Related Art

In a known image forming apparatus of an electrophotographic type, an electrically charged photoconductor drum is irradiated with a light source such as a laser and the voltage of a corresponding portion of the photoconductor drum is changed to cause toner to adhere thereto. Then, a toner image formed on the photoconductor drum is transferred to a printing paper by a transfer roller applied with a voltage opposite from the photoconductor drum. Thereafter, a fixing roller fixes the toner with heat and pressure. Accordingly, a printing result is obtained on the printing paper.

Here, in order to express tones of an image artificially, there is a case such that a halftoning using a dither matrix is performed. By the halftoning, for example, input image data of 256 tones is converted into two-tone output image data, and an image is formed on the basis of the output image data, so that dots of a size according to the tone are arranged discretely at regular pitches, whereby an image in which the tone is artificially reproduced is formed.

However, when the photoconductor drum is driven by a drum gear, a drive force from a drive motor is transmitted to the photoconductor drum via a drive gear and the above-described drum gear engaging therewith. In this configuration, when the drive gear and the drum gear engage, the uneven rotation occurs. It may causes that the pitches of the dots discretely arranged and the cycle of uneven rotation get closer as a result of the halftoning, interference may occur between them, and interference fringes (variable density in the image) may be generated.

SUMMARY

A need has arisen to provide an image forming apparatus and an image forming system in which generation of interference fringes in a printing medium may be reduced or restrained.

According an embodiment of the present invention, an image forming apparatus comprises an image data generating unit configured to convert a tone of an input value which indicates a density of a pixel by using a predetermined dither matrix and generate image data. The image forming apparatus further comprises a scanning unit configured to scan an image carrier in a primary scanning direction according to the image data generated by the image data generating unit and an image forming unit configured to form, on a printing medium, an image corresponding to the image data scanned by the scanning unit. The image forming apparatus still further comprises a drive source and a gear configured to transmit a drive force from the drive source to the image carrier. The dither matrix includes a plurality of sub-matrixes arranged in a predetermined rule and each of the plurality of sub-matrix having predetermined threshold values such that a dot in each of the plurality of the sub-matrixes grows from a corresponding original point. The image forming apparatus satisfies a relation of (1) a≧0.08 mm and b/a<0.80, or (2) a<0.08 mm and b/a>1.27, where "a" is a travel distance of a printing medium per tooth of the gear in a secondary scanning direction orthogonal to the primary scanning direction, and "b" is a distance between the corresponding original points of a pair of the dots formed on the printing medium apart from each other in the secondary scanning direction on the basis of a pair of the sub-matrixes adjacent to each other in the primary scanning direction in the dither matrix.

According an embodiment of the present invention, an image forming system comprises an image forming apparatus and a computer which communicate with the image forming apparatus. The image forming apparatus comprises a scanning unit configured to scan an image carrier in a primary scanning direction according to image data and an image forming unit configured to form, on a printing medium, an image corresponding to the image data scanned by the scanning unit. The image forming apparatus further comprises a drive source and a gear configured to transmit a drive force from the drive source to the image carrier. The computer comprises an image data generating unit configured to convert an input value which indicates a density of a pixel by using a predetermined dither matrix and generate image data. The dither matrix includes a plurality of sub-matrixes arranged in a predetermined rule and each of the plurality of sub-matrix having predetermined threshold values such that a dot in each of the plurality of the sub-matrixes grows from a corresponding original point. The image forming system satisfies a relation of (1) a≧0.08 mm and b/a<0.80, or (2) a<0.08 mm and b/a>1.27, where "a" is a travel distance of a printing medium per tooth of the gear in a secondary scanning direction orthogonal to the primary scanning direction, and "b" is a distance between the corresponding original points of a pair of the dots formed on the printing medium apart from each other in the secondary scanning direction on the basis of a pair of the sub-matrixes adjacent to each other in the primary scanning direction in the dither matrix.

BRIEF DESCRIPTION OF THE DRAWINGS

For a more complete understanding of the present invention, the needs satisfied thereby, and the features and advantages thereof, reference now is made to the following descriptions taken in connection with the accompanying drawings.

FIG. 12 is a drawing showing a result of experiment which has inspected an adequate range of a gear pitch a for respective line pitches b when the dither matrixes from Pattern 1 to Pattern 6 described with reference to FIG. 6 to FIG. 11 are applied.

FIG. 17A is a drawing showing an example of a sequence of growth of the dot for forming a rod-like dot parallel to the primary scanning direction.

FIG. 17B is a drawing showing an example of the threshold values allocated to the dither matrix according to the smallest threshold value shown in FIG. 15B and the sequence of the growth of the dot shown in FIG. 17A.

FIG. 18A is a drawing explaining an example of adjustment of the threshold values arranged in the dither matrix.

FIG. 18B is a drawing explaining an example of the adjustment of the threshold values arranged in the dither matrix.

DESCRIPTION OF THE PREFERRED EMBODIMENTS

Embodiments of the present invention and their features and advantages may be understood by referring to FIGS. 1-21, like numerals being used for like corresponding parts in the various drawings.

Figure 1:
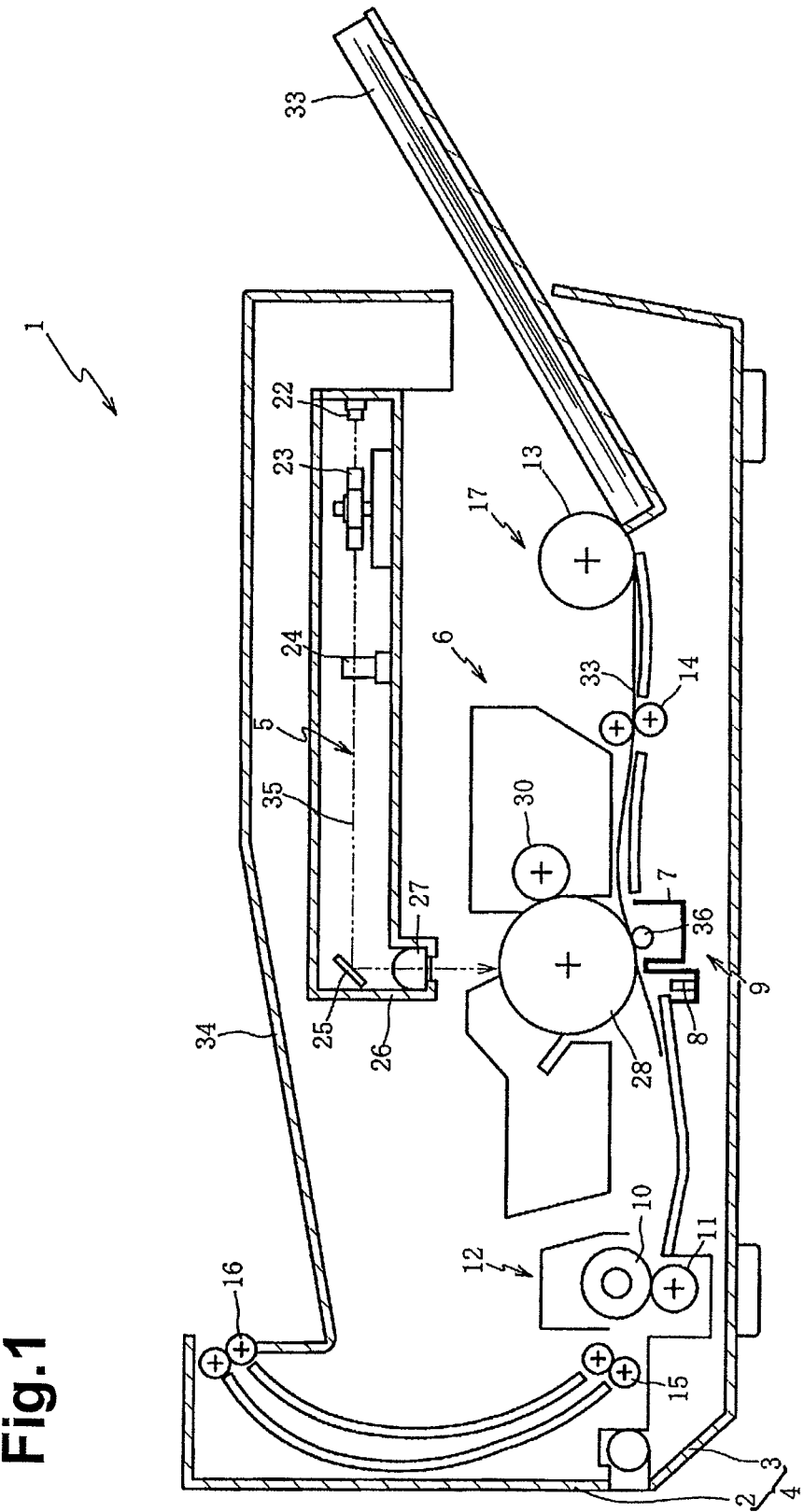
FIG. 1 is a schematic cross-sectional view of a laser printer as an embodiment of an image forming apparatus.

FIG. 1 is a schematic cross-sectional view of a laser printer 1 as an embodiment of an image forming apparatus. As shown in FIG. 1, the laser printer 1 comprises a printer casing 4 comprising an upper casing 2 and a lower casing 3, a laser scanner apparatus 5 provided on the upper casing 2, a process cartridge 6 demountably provided on the lower casing 3, a transferring and separating device 9 comprising a transfer charger 7 and a charge removing needle 8, a fixing device 12 comprising a heat roller 10 and a pressure roller 11, and a transporting apparatus 17 comprising a paper feeding roller 13, a resist roller 14, a transfer roller 36 configured to transfer a visible image on a photoconductor drum 28 to a printing paper 33, a transporting roller 15, and a paper-discharging roller 16.

The laser scanner apparatus 5 comprises a semiconductor laser 22, a hexahedron mirror 23, an imaging lens 24, a reflecting mirror 25, and a lens member 27 formed of synthetic resin provided at a laser light outlet portion 26. The process cartridge 6 is demountably disposed in the lower casing 3, and comprises the photoconductor drum 28 and a developing cylinder 30 integrally assembled in the interior thereof.

A laser light 35 emitted from the semiconductor laser 22 and entered into the hexahedron mirror 23 is deflected by a predetermined angle via every mirror surfaces of the hexahedron mirror 23 rotating at a constant high speed for primary scanning over a predetermined angular range, is passed through the imaging lens 24, is reflected vertically downward by the reflecting mirror 25, then is passed through the lens member 27 elongated in a scanning direction of the laser light 35, and enters the photoconductor drum 28. The laser light 35 entered into the photoconductor drum 28 performs a secondary scanning with the photoconductor drum 28 rotating at a constant velocity by a drum driving mechanism 40 (shown in FIG. 2) described later, so that an electrostatic latent image is formed on a peripheral surface of the photoconductor drum 28. The laser printer 1 scans the photoconductor drum 28 according to image data described later to form an electrostatic latent image according to the image data.

The electrostatic latent image formed on the photoconductor drum 28 is developed by toner supplied from the developing cylinder 30 and is transferred onto the printing paper 33, then the printing paper 33 is separated from the photoconductor drum 28 by the charge removing needle 8 and is transported to the fixing device 12. The fixing device 12 is configured to fuse and fix the toner to the printing paper 33 by the heat roller 10 and the pressure roller 11, and then transport the printing paper 33 onto a paper discharging tray 34 via the transporting roller 15 and the paper-discharging roller 16.

Figure 2:
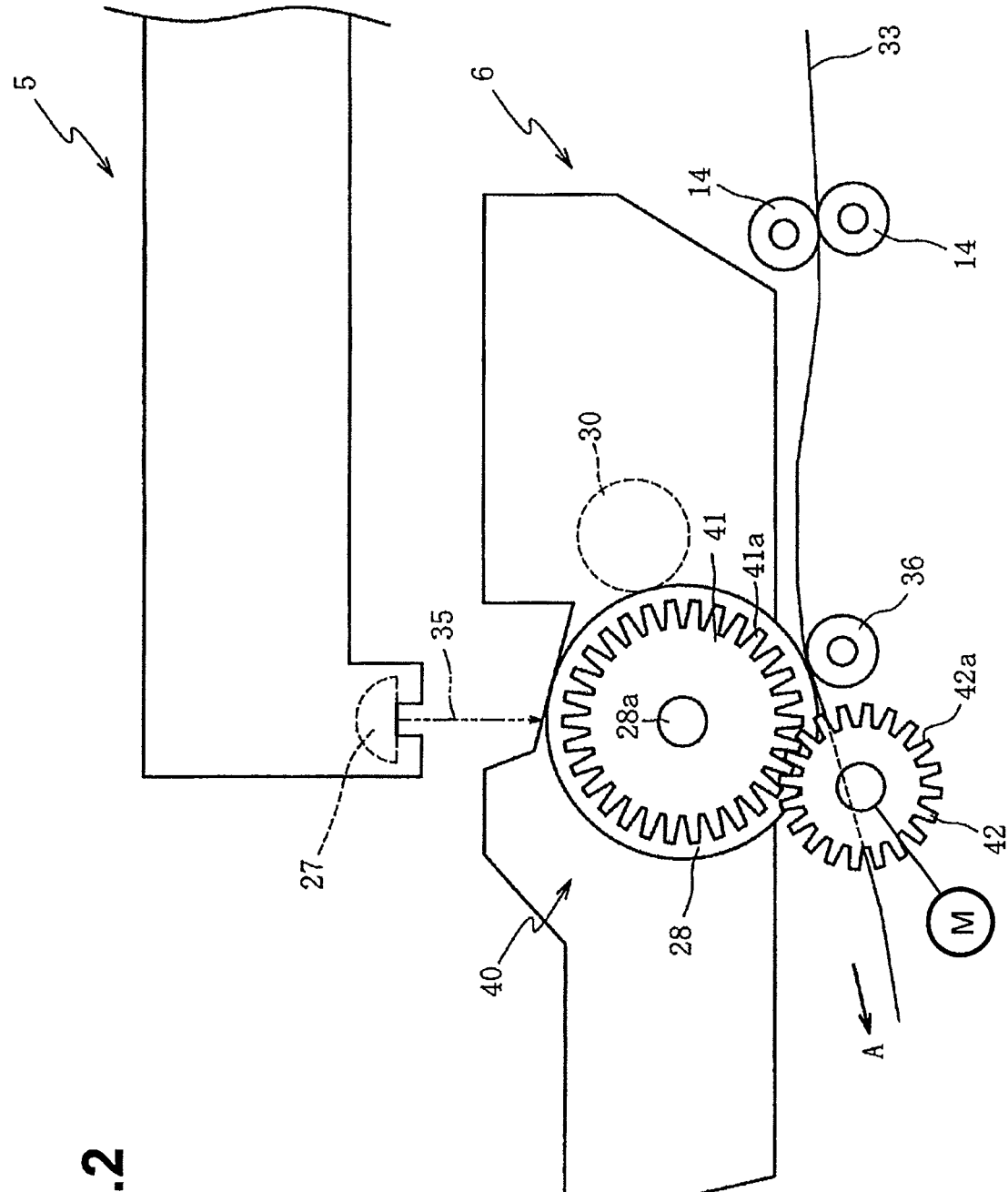
FIG. 2 is a schematic drawing showing a drum driving mechanism.

FIG. 2 is a schematic drawing showing the drum driving mechanism 40. A large-diameter drum gear 41 formed of synthetic resin is secured to a drum shaft 28a of the photoconductor drum 28, and a small-diameter drum driving gear 42 which engages the drum gear 41 is driven to rotate by a coupling mechanism coupled to a main motor M as a drive source. In other words, the drum driving mechanism 40 comprises gears 41, 42 configured to transmit a drive force from the main motor M to the photoconductor drum 28. In contrast, the paper feeding roller 13, the resist roller 14, the transfer roller 36, the transporting roller 15, the paper-discharging roller 16, and the like described with reference to FIG. 1 are configured to be driven to rotate by the main motor M synchronously with the velocity of rotation of the photoconductor drum 28. In other words, the printing paper 33 is configured to be transported synchronously with the rotation of the photoconductor drum 28.

Here, in a case where the drum gear 41, that is, the photoconductor drum 28 is driven to rotate by the rotation of the drum driving gear 42, since it is achieved by engagement between gear teeth 42*a* of the drum driving gear 42 and gear teeth 41*a* of the drum gear 41, an engaging operation from a start-of-engagement phase angle to an end-of-engagement phase angle of the gear tooth 42*a* with respect to the gear tooth 41*a* is repeated at every tooth 41*a* of the drum gear 41 and, consequently, the velocity of rotation of the drum gear 41, that is, of the photoconductor drum 28 changes every pitch angle α between the adjacent two gear teeth 41*a* depending on accuracy of finishing or material of the drum gear 41.

When the drum gear 41 is rotated by the pitch angle α, that is, by a circular pitch (obtained by dividing a pitch circle by the number of teeth) a travel distance by which a point on a surface of the photoconductor drum 28 is moved is defined as a gear pitch "a". The value of the gear pitch "a" is obtained by a unit of mm. Since the photoconductor drum 28 is subjected to unevenness of the velocity of rotation when the gear tooth 41*a* engages the gear tooth 42*a*, inconsistencies in density occur on a printing result on the printing paper 33 every gear pitch a due to the unevenness of the velocity.

Figure 3:
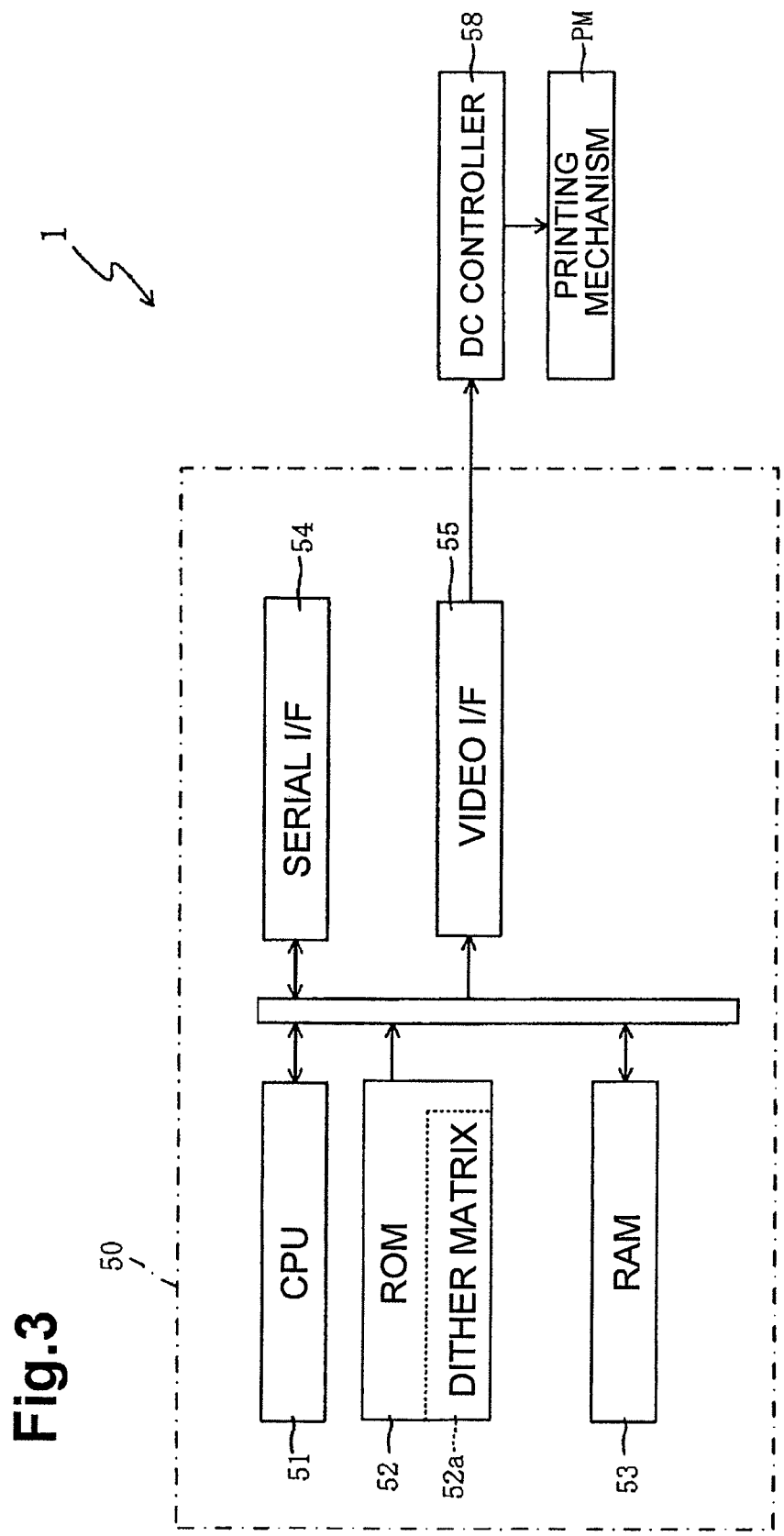
FIG. 3 is a block diagram showing an electric configuration of the laser printer.

FIG. 3 is a block diagram showing an electric configuration of the laser printer 1. As shown in FIG. 3, a video controller 50 of the laser printer 1 comprises a CPU 51, a ROM 52 in which various control programs stored therein, a RAM 53 provided with various memories such as receiving buffers configured to receive and store image data transmitted from a data transmitting instrument (not shown) such as a personal computer or a host computer, a serial interface (S·I/F) 54 configured to receive data transmitted from the external data transmitting instrument (not shown), and a video interface (V·I/F) 55 configured to output print data converted into bit image data in sequence to a DC controller 58, and these members are connected respectively to the CPU 51.

Here, a printing mechanism PM is provided with the above-described laser scanner apparatus 5, the process cartridge 6, the transferring and separating device 9, the fixing device 12, and the transporting apparatus 17, as well as the main motor M which drives the photoconductor drum 28 and the transporting apparatus 17, a fixing heater for the heat roller 10, and other electrical component circuits, and the DC controller 58 is configured to control the drive of a scanner motor which drives the semiconductor laser 22 and the hexahedron mirror 23 in addition to the main motor M, the fixing heater, and various electric component circuits.

The ROM 52 stores a preset dither matrix 52*a* in addition to the various control programs provided in normal laser printers. The CPU 51 functions as image data generating unit configured to generate image data by performing a halftoning according to the control programs stored in the ROM 52.

In the halftoning, the dither matrix 52*a* is superimposed on an input image, and input values which represent densities of pixels of the input image are compared with threshold values, which are elements constituting the dither matrix 52*a*, in one-to-one correspondence. Then, when the input value is equal to or larger than the threshold value, the input value is converted into "1" which means that the toner is fixed to the pixels having the corresponding input value, and if the input value is smaller than the threshold value, the input value is converted into "0" which means that the toner is not fixed to the pixels having the corresponding input value, so that the input values of the 256 tones are converted into two-tone image data. Therefore, the larger the number of pixels having the input values equal to or larger than the threshold value in the pixels within a range that the dither matrix 52*a* covers, the more the pixels on which the toner is to be fixed within the corresponding range increases, so that the tones of the image can be artificially expressed. Here, the CPU 51 corrects and outputs the image data by a known image processing such as gamma correction or the like together with the halftoning.

Figure 4:
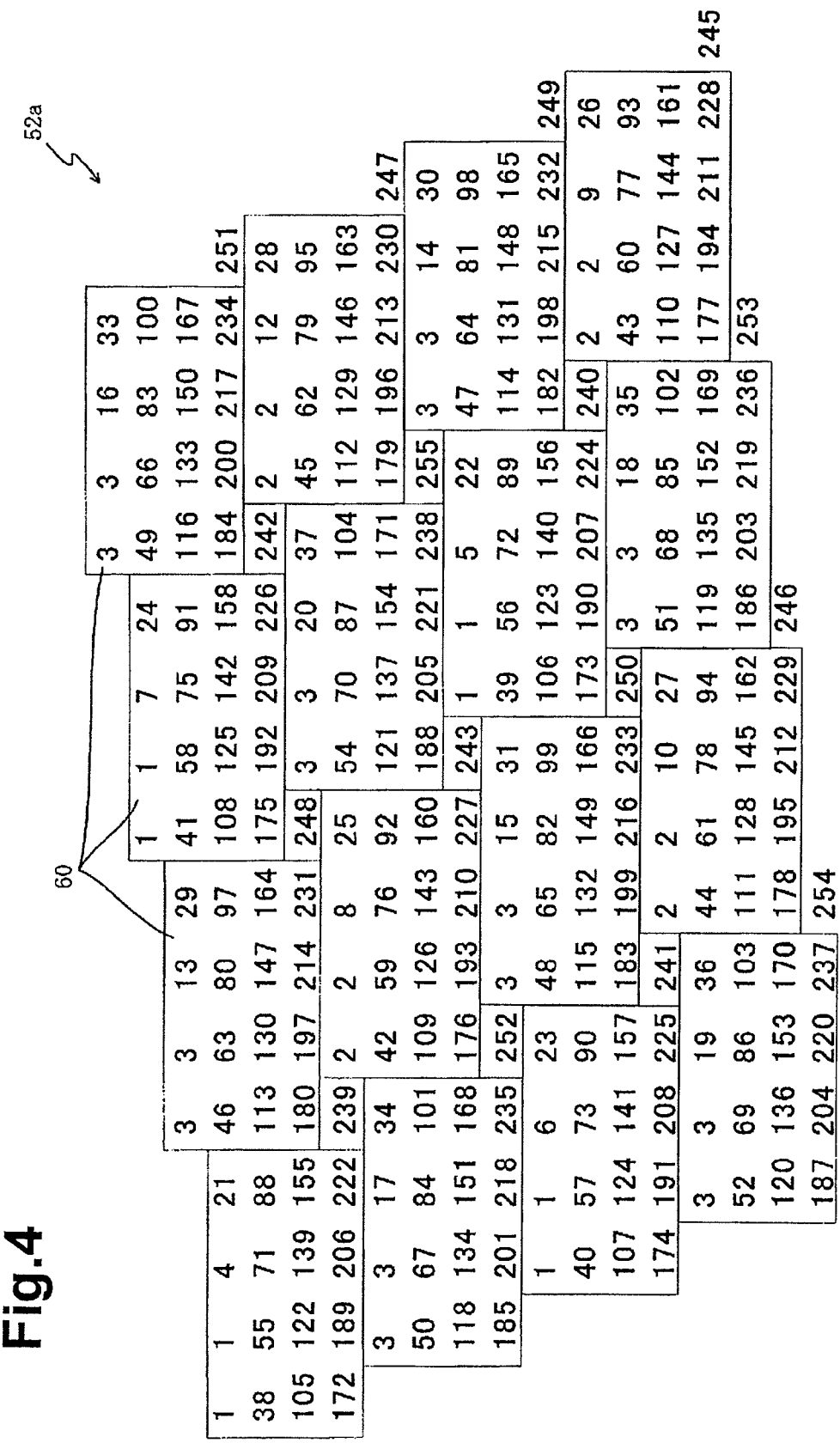
FIG. 4 is a drawing showing an example of a dither matrix.

FIG. 4 is a drawing showing an example of the dither matrix 52*a* stored in the ROM 52 of the laser printer 1. In the halftoning, the dither matrix 52*a* is superimposed on the input image in a positional relationship such that a lateral direction of the dither matrix 52*a* shown in FIG. 4 corresponds to a primary scanning direction, and a vertical direction of the dither matrix 52*a* corresponds to a secondary scanning direction, so that the threshold values and the input values of the pixels are compared.

As shown in FIG. 4, the dither matrix 52*a* includes sets of sixteen sub-matrixes 60 arranged regularly.

In each of the sub-matrixes 60, a smallest threshold value within the sub-matrix 60 (hereinafter, referred simply as smallest threshold value) is arranged at a left end of an uppermost row. Then, in the uppermost row, a row of threshold values arranged in an ascending order from the left end to a right end is allocated. In a second uppermost row, a row of threshold values arranged in the ascending order from a threshold value which is next largest after the rightmost threshold value of the uppermost row is allocated. In this manner, the threshold values are arranged in sequence so as to be larger as it goes toward the lower rows.

In other words, the sub-matrix 60 includes the threshold values set in such a manner that one dot formed at an original point which corresponds to the smallest threshold value extends in the primary scanning direction as the density of the pixel within a range that the sub-matrix 60 covers increases to form a rod-like dot shape, and the rod-like dot is increased in thickness in the secondary scanning direction as the density further increases.

Subsequently, arrangement of the sub-matrixes 60 which constitute the dither matrix 52*a* will be described. As shown in FIG. 4, in the dither matrix 52*a*, the sub-matrixes 60 adjacent to each other in the lateral direction (corresponding to the primary scanning direction) are arranged regularly by being shifted by one threshold value in the vertical direction (corresponding to the secondary scanning direction). Since one dot is formed corresponding to one sub-matrix 60 as described above, according to the dither matrix 52*a*, the respective dots corresponding to the sub-matrixes 60 are formed in regular arrangement so that the original points are shifted in the secondary scanning direction by an extent corresponding to one pixel.

Figure 5A:
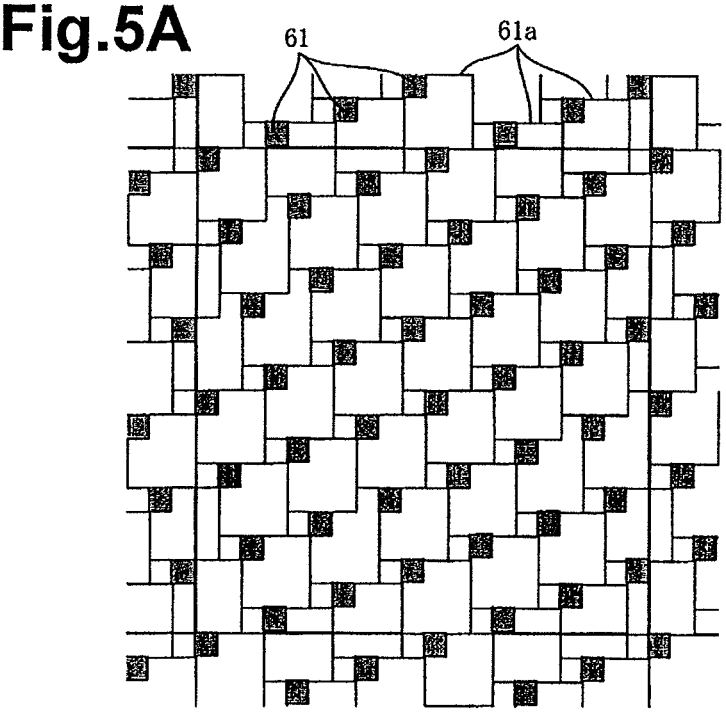
FIG. 5A is a conceptual drawing showing a relation between original points of dots arranged regularly on a printing paper and ranges that sub-matrixes cover.

FIG. 5A is a conceptual drawing showing the relation between original points 61 of the dots arranged regularly on the printing paper 33, and ranges 61*a* that the sub-matrixes 60 cover. As shown in FIG. 5A, the each original point 61 of the dot is formed at an upper left corner of the range 61*a* that the one sub-matrix 60 covers.

Figure 5B:
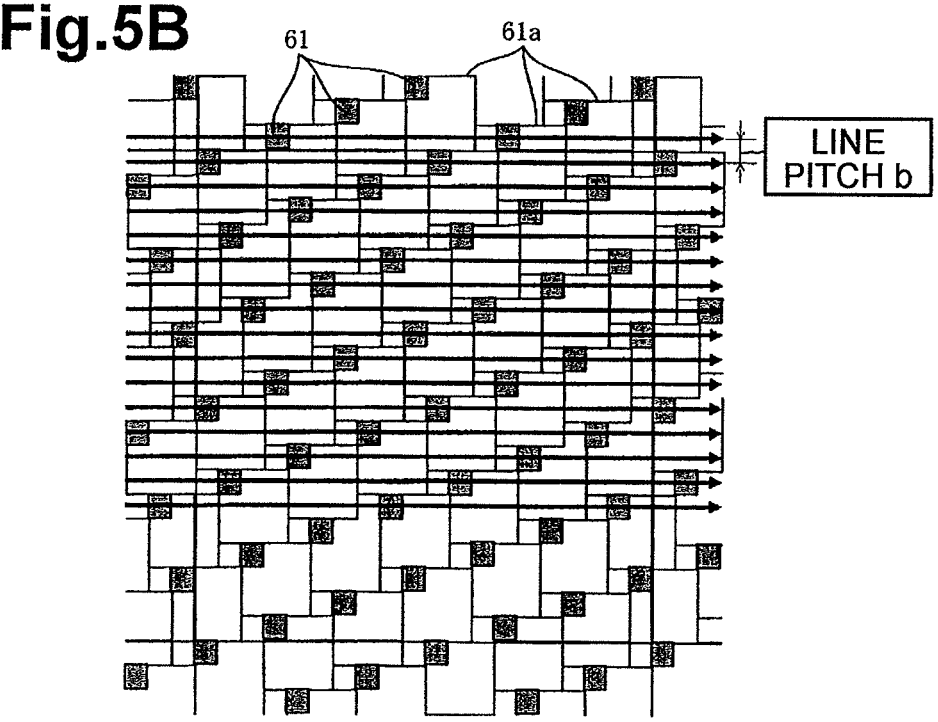
FIG. 5B is a drawing showing arrows passing through the original points of the dots formed on the printing paper in parallel to a primary scanning direction being overlapped with the conceptual drawing shown in FIG. 5A.

FIG. 5B is a drawing showing arrows passing through the original points 61 of the dots formed on the printing paper 33 in parallel to the primary scanning direction being overlapped with the conceptual drawing shown in FIG. 5A. As described in conjunction with FIG. 4, the dots formed corresponding to the respective sub-matrixes 60 each extends from the original point 61 in the primary scanning direction to form a rod-like dot shape when the density of the pixel within the range that the sub-matrix 60 covers is small, that is, in a low-density portion. In other words, the rod-like dots grow on the arrows shown in FIG. 5B.

In this embodiment, the distance between the original points 61 of the dots in the secondary scanning direction is referred to as a line pitch b. In other words, a component in the secondary scanning direction of the distance between the original points 61 of the pair of dots formed by the sub-matrixes 60 adjacent to each other in the primary scanning direction is referred to as the line pitch "b". The value of the line pitch "b" is obtained in a unit of mm.

Then, the laser printer 1 in this embodiment is configured so that the line pitch b (that is, the distance between the original points 61 of the pair of dots formed on the printing paper 33 apart from each other in the secondary scanning direction) and the gear pitch a satisfy a relational expression; a≧0.08 mm and b/a<0.80, or a<0.08 mm and b/a>1.27.

In this configuration, generation of the interference fringes caused by the interference between the cycle of the original point of the rod-like dot in the secondary scanning direction and the cycle of the uneven rotation caused by the engagement of the gears can be restrained.

Also, in a case of employing a dither matrix having a configuration different from the dither matrix 52a described with reference to FIG. 4 and FIGS. 5A and 5B, the effect of restraining the interference fringes is also achieved by applying the numerical value range described above.

Referring now to FIGS. 6A and 6B to FIG. 11, various dither matrixes having configurations different from the dither matrix 52a are exemplified, and the effect obtained when the numerical value range described above is applied about the various dither matrixes shown in FIGS. 6A and 6B to FIG. 11 will be described.

Figure 6A:
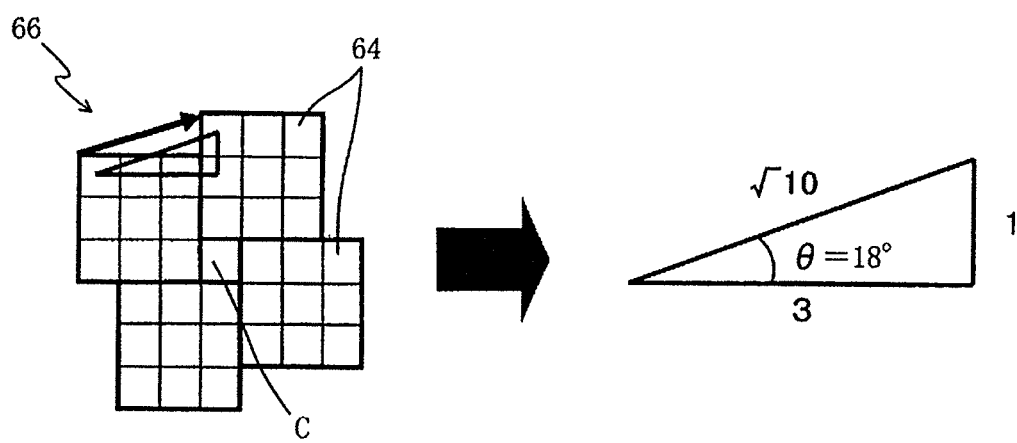
FIG. 6A is a drawing showing a relation between a sub-matrix having 3×3 elements and a basic unit formed as an assembly of the sub-matrixes.

FIG. 6A is a drawing showing a relation between a sub-matrix 64 having 3×3 elements and a basic unit 66 formed by assembling four sub-matrixes 64. As shown in FIG. 6A, by configuring the basic unit 66 by shifting the sub-matrixes 64 having 3×3 elements by an extent corresponding to three elements in the primary scanning direction and by an extent corresponding to one element in the secondary scanning direction, an angle of a line connecting the original points of the dots formed with respect to the primary scanning direction (hereinafter, referred to as a screen angle θ) becomes about 18°.

A threshold value which does not belong to any sub-matrix 64, which is surrounded by the sub-matrixes 64, is referred to as an inter-sub-matrix cell C, hereinafter. As shown in FIG. 6A, the basic unit 66 is configured to include one inter-sub-matrix cell C.

Figure 6B:
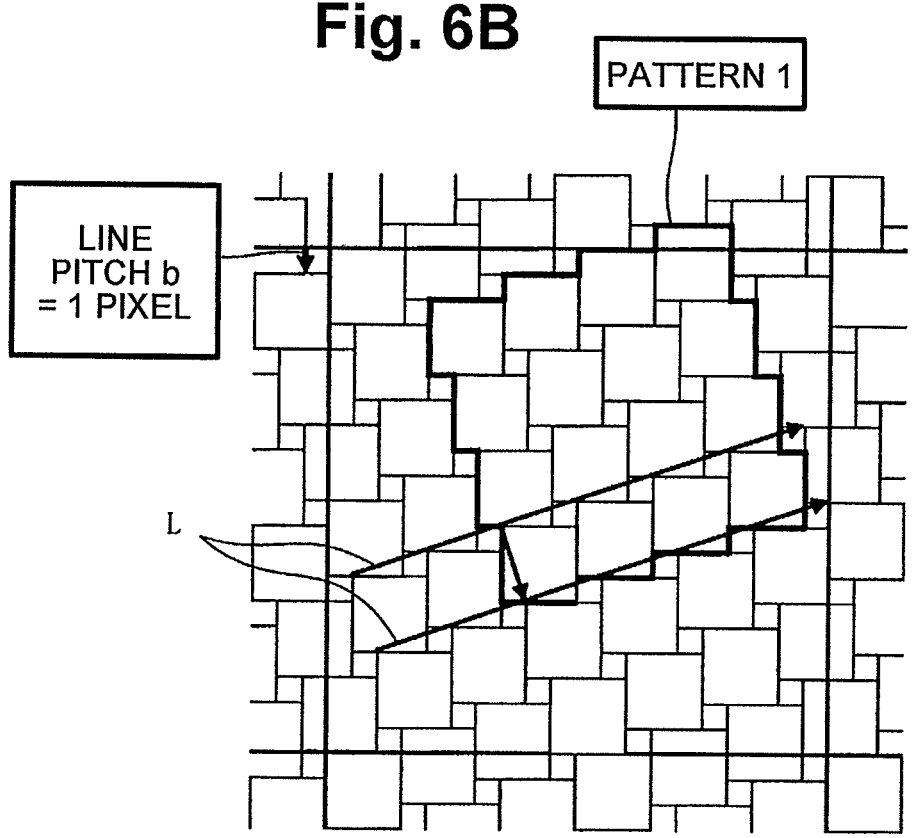
FIG. 6B is a conceptual drawing showing a range that a dither matrix in Pattern 1 formed by combining the basic units as shown in FIG. 6A covers.

FIG. 6B is a conceptual drawing showing a dither matrix formed by combining the basic units 66 as shown in FIG. 6A (hereinafter referred to as Pattern 1), and a range that the dither matrix covers. When performing the halftoning using the dither matrix in Pattern 1 at a resolution of 600 dpi, the number of screen lines is about 190 lpi (line per inch), and the line pitch b has a length corresponding to one pixel (about 0.042 mm). The term "the number of screen lines" means a value which indicates the number of original points of the dots included per inch in a direction vertical to a line L connecting the original points of the dots.

Figure 7A:
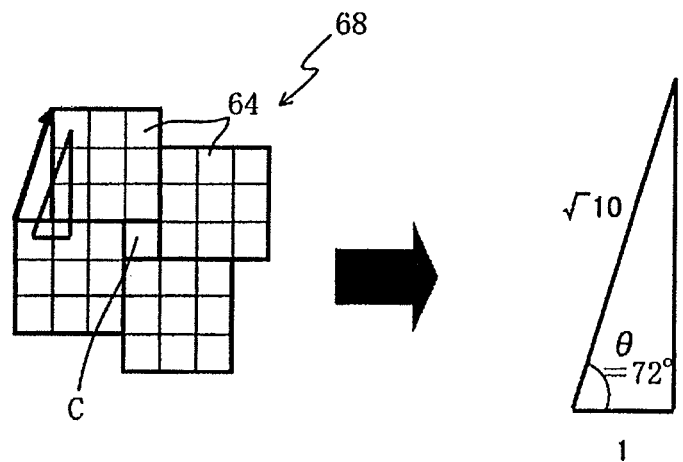
FIG. 7A is a drawing showing a relation between a sub-matrix having 3×3 elements and a basic unit formed as an assembly of the sub-matrixes.

FIG. 7A is a drawing showing a relation between the sub-matrix 64 having 3×3 elements and a basic unit 68 formed by assembling four sub-matrixes 64. As shown in FIG. 7A, with the basic unit 68 formed by shifting the sub-matrixes 64 having 3×3 elements by an extent corresponding to one element in the primary scanning direction and by an extent corresponding to three elements in the secondary scanning direction, the screen angle θ becomes about 72°. As shown in FIG. 7A, the basic unit 68 is configured to include one inter-sub-matrix cell C.

Figure 7B:
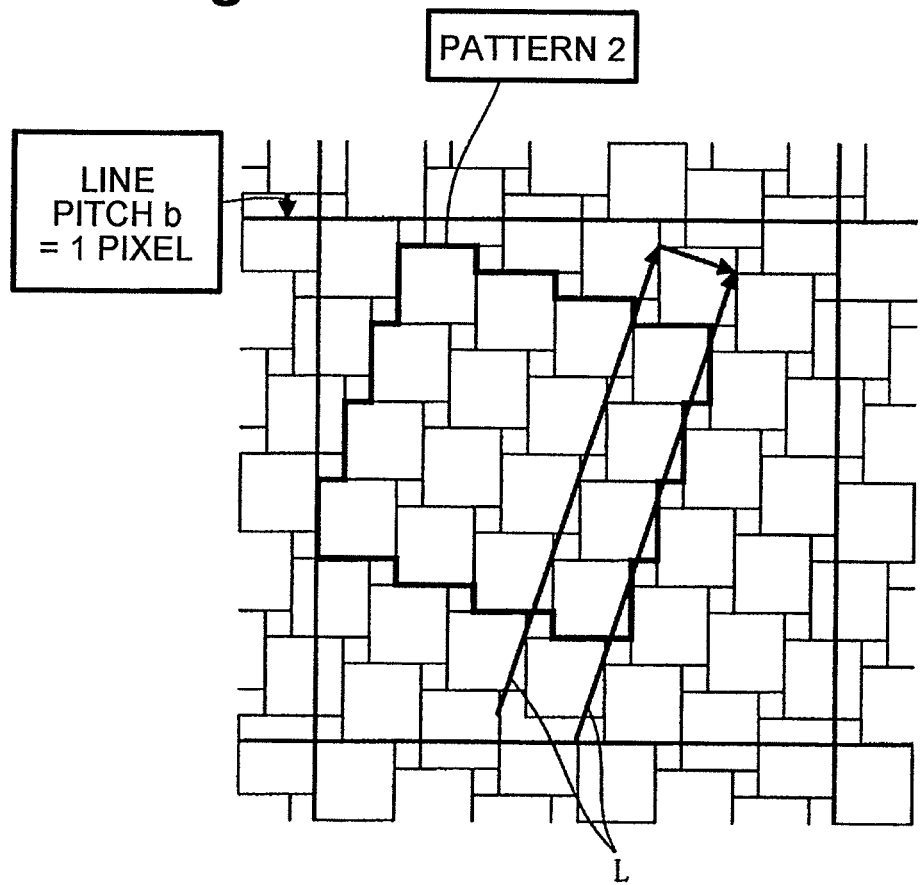
FIG. 7B is a conceptual drawing showing a range that a dither matrix in Pattern 2 formed by combining the basic units as shown in FIG. 7A covers.

FIG. 7B is a conceptual drawing showing a range that a dither matrix formed by combining the basic units 68 as shown in FIG. 7A (hereinafter referred to as Pattern 2) covers. When performing the halftoning using the dither matrix in Pattern 2 at the resolution of 600 dpi, the number of screen lines is about 190 lpi, and the line pitch b has the length corresponding to one pixel (about 0.042 mm).

Figure 8A:
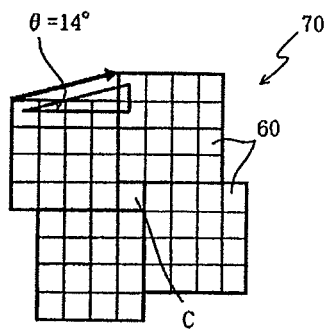
FIG. 8A is a drawing showing a relation between a sub-matrix having 4×4 elements and a basic unit formed as an assembly of the sub-matrixes.

FIG. 8A is a drawing showing a relation between the sub-matrix 60 having 4×4 elements and a basic unit 70 formed by assembling four sub-matrixes 60. As shown in FIG. 8A, with the basic unit 70 formed by shifting the sub-matrix 60 having 4×4 elements by an extent corresponding to four elements in the primary scanning direction and by an extent corresponding to one element in the secondary scanning direction, the screen angle θ becomes about 14°. As shown in FIG. 8A, the basic unit 70 is configured to include one inter-sub-matrix cell C.

Figure 8B:
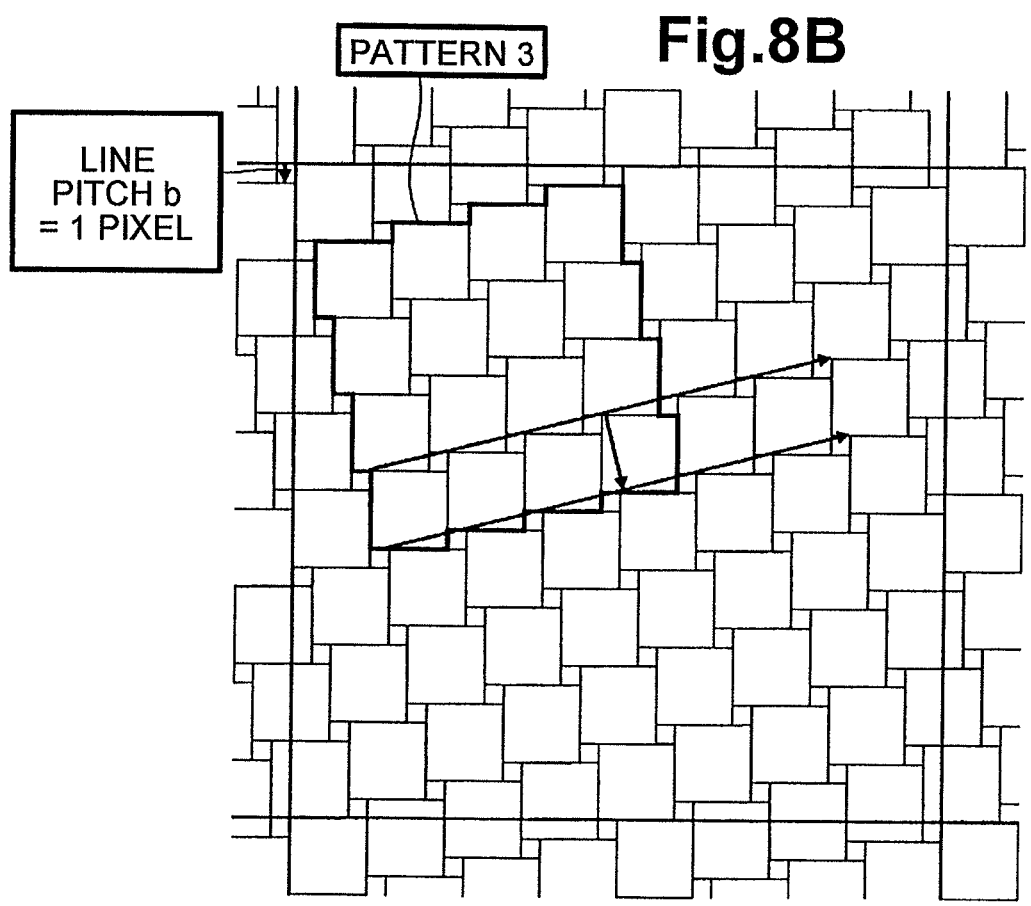
FIG. 8B is a conceptual drawing showing a range that a dither matrix in Pattern 3 formed by combining the basic units as shown in FIG. 8A covers.

FIG. 8B is a conceptual drawing showing a range that a dither matrix formed by combining the basic units 70 as shown in FIG. 8A (hereinafter referred to as Pattern 3) covers. When performing the halftoning using the dither matrix in Pattern 3 at the resolution of 600 dpi, the number of screen lines is about 145 lpi, and the line pitch b has the length corresponding to one pixel (about 0.042 mm).

Figure 9A:
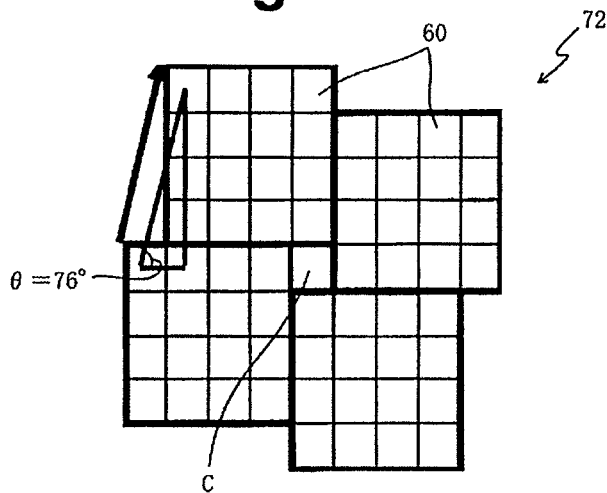
FIG. 9A is a drawing showing a relation between a sub-matrix having 4×4 elements and a basic unit formed as an assembly of the sub-matrixes.

FIG. 9A is a drawing showing a relation between the sub-matrix 60 having 4×4 elements and a basic unit 72 formed as an assembly of the sub-matrixes 60. As shown in FIG. 9, with the basic unit 72 formed by shifting the sub-matrix 60 having 4×4 elements by an extent corresponding to one element in the primary scanning direction and by an extent corresponding to four elements in the secondary scanning direction, an angle of the line connecting the original points of dots formed with respect to the primary scanning direction becomes about 76°. The basic unit 72 is configured to include the inter-sub-matrix cell C including two threshold values in total; two in the vertical direction, and one in the lateral direction.

Figure 9B:
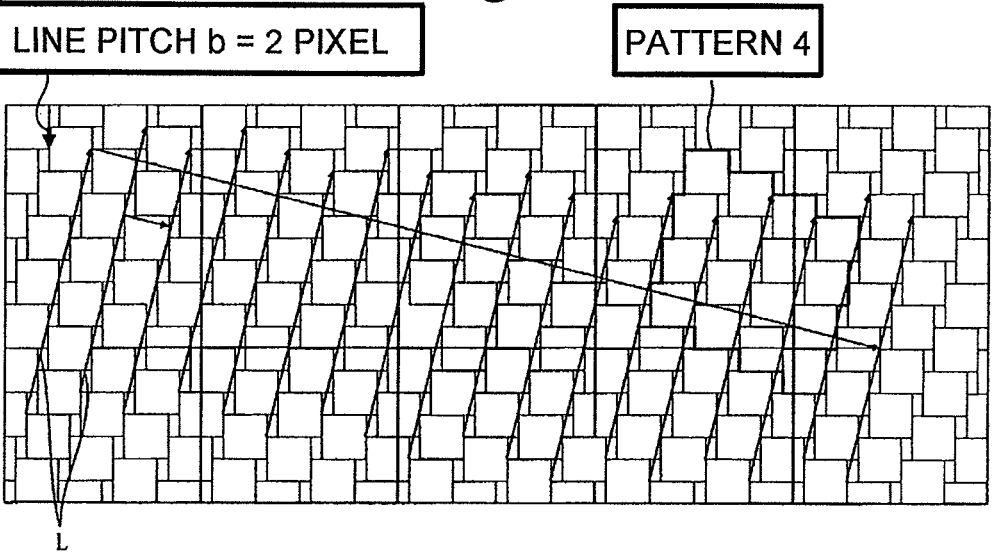
FIG. 9B is a conceptual drawing showing a range that a dither matrix in Pattern 4 formed by combining the basic units as shown in FIG. 9A covers.

FIG. 9B is a conceptual drawing showing a range that a dither matrix formed by combining the basic units 72 as shown in FIG. 9A (hereinafter referred to as Pattern 4) covers. When performing the halftoning using the dither matrix in Pattern 4 at the resolution of 600 dpi, the number of screen lines is about 137 lpi, and the line pitch b has a length corresponding to two pixels (about 0.085 mm).

Figure 10:
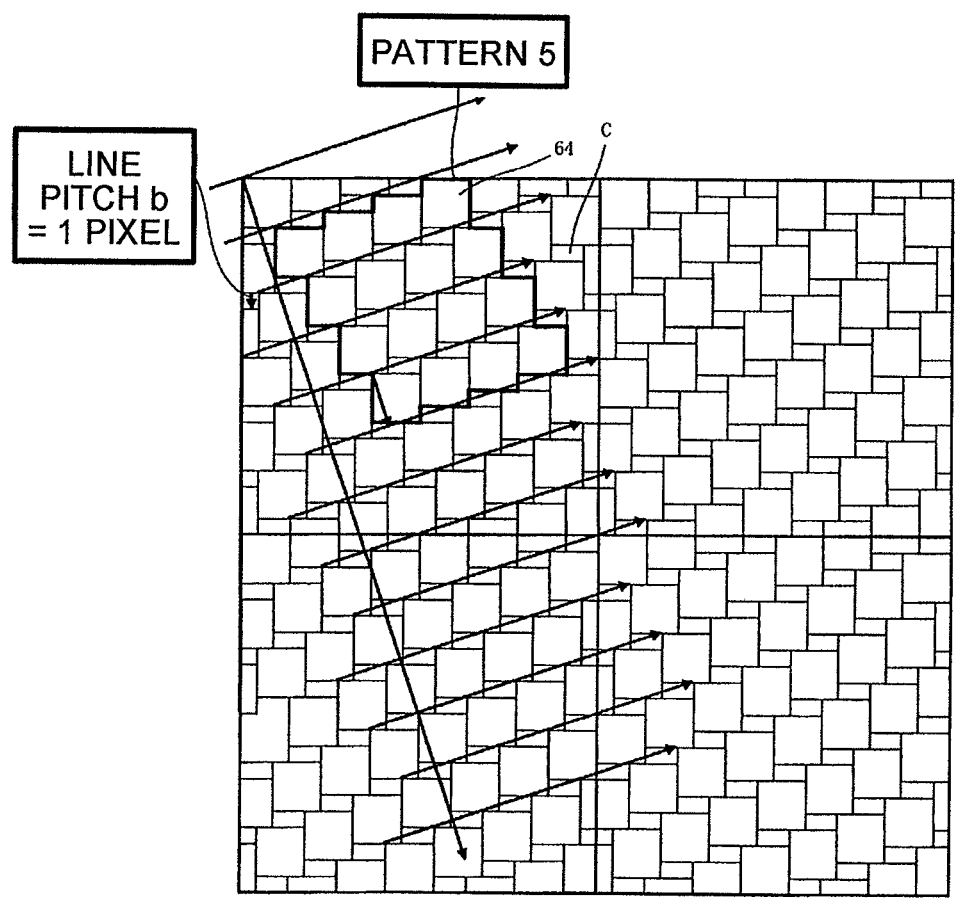
FIG. 10 is a conceptual drawing showing a dither matrix in Pattern 5 formed by combining the sub-matrixes including 3×3 elements, and a range that the dither matrix covers.

FIG. 10 is a conceptual drawing showing a dither matrix in Pattern 5 formed by combining the sub-matrixes 64 including 3×3 elements, and a range that the dither matrix covers. The sub-matrixes 64 shown in FIG. 10 are arranged with the intermediary of the inter-sub-matrix cell C including two threshold values in total; two in the lateral direction and one in the vertical direction, between the four sub-matrixes 64. When performing halftoning using the dither matrix in Pattern 5 at the resolution of 600 dpi, the number of screen lines is about 172 lpi, and the line pitch b has the length corresponding to one pixel (about 0.042 mm). The screen angle is about 18.4°.

Figure 11:
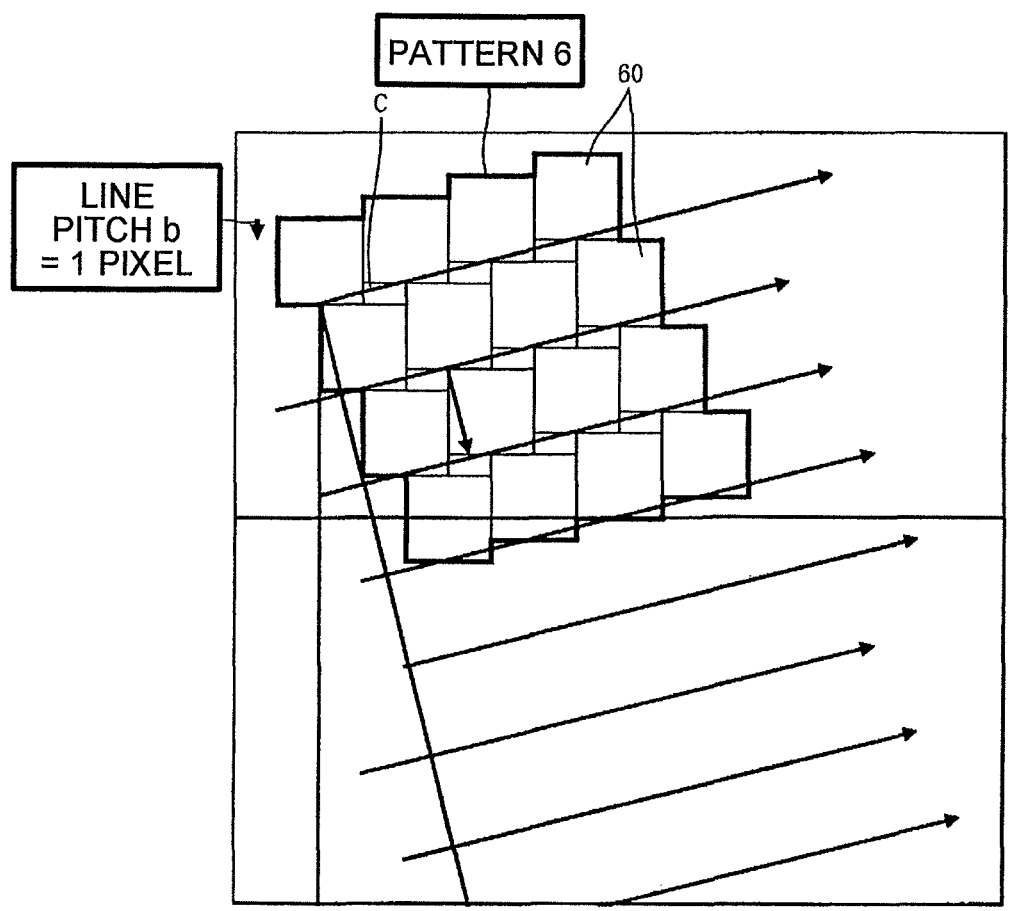
FIG. 11 is a conceptual drawing showing a dither matrix in Pattern 6 formed by combining the sub-matrixes including 4×4 elements, and a range that the dither matrix covers.

FIG. 11 is a conceptual drawing showing a dither matrix in Pattern 6 formed by combining the sub-matrixes 60 including 4×4 elements, and a range that the dither matrix covers. The sub-matrixes 60 shown in FIG. 11 are arranged with the intermediary of the inter-sub-matrix cell C including two threshold values in total; two in the lateral direction and one in vertical direction, between the four sub-matrixes 60. According to the dither matrix in Pattern 6 as described above, the number of screen lines is about 137 lpi, and the line pitch b has the length corresponding to one pixel (about 0.042 mm). The screen angle is about 14°.

FIG. 12 is a drawing showing a result of experiment which has inspected an adequate range of the gear pitch a for respective line pitches b when the dither matrixes from Pattern 1 to Pattern 6 described with reference to FIGS. 6A and 6B to FIG. 11 are applied.

The present inventor has done an experiment about whether the interference fringes were generated or not as a result of printing out the image data applied with the halftoning using the dither matrixes from Pattern 1 to Pattern 6 using a laser printer at the resolution of 600 dpi. The number of teeth was changed by changing the outer diameter of the gear while fixing the module of the gear and the gear pitch a was changed accordingly.

In a table shown in FIG. 12, "GOOD" indicates that no interference fringe is generated or the interference fringes are restrained to an allowable level, and "NG" indicates that the interference fringes are generated to an extent exceeding the allowable level. Numerical values (b/a) obtained by dividing the line pitch b by the gear pitch a are shown above "GOOD" or "NG" indicate the results of evaluation.

As shown in FIG. 12, a result such that when the relational expression; $a \geq 0.08$ mm and $b/a < 0.80$ is satisfied, no interference fringe is generated or the interference fringes are restrained to the allowable level was obtained. Also, a result such that when the relational expression; $a < 0.08$ mm and $b/a > 1.27$ is satisfied, no interference fringe is generated or the interference fringes are restrained to the allowable level was obtained.

Subsequently, referring now to FIGS. 13A, 13B and 13C to FIGS. 18A, and 18B, a sequence of designing the dither matrix will be described. When designing the dither matrix, first of all, the size (the number of elements) of the sub-matrixes is determined from the intended number of screen lines. For example, when a range of the number of screen lines from 150 lpi to 200 lpi is intended, a size of the sub-matrix of 3×3 is determined. Also, For example, when a range of the number of screen lines from 120 lpi to 150 lpi is intended, a size of the sub-matrix of 4×4 is determined.

Subsequently, arrangement of the sub-matrixes which constitute the basic unit is determined from the intended screen angle and the number of screen lines.

Figure 13C:
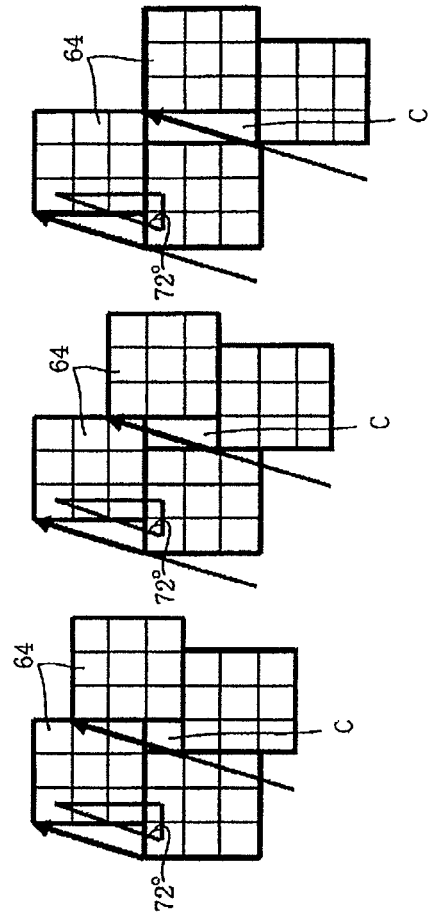
FIG. 13C is a drawing for explaining the relation between the arrangement of the sub-matrixes, the screen angle, and the number of screen lines.
Figure 13B:
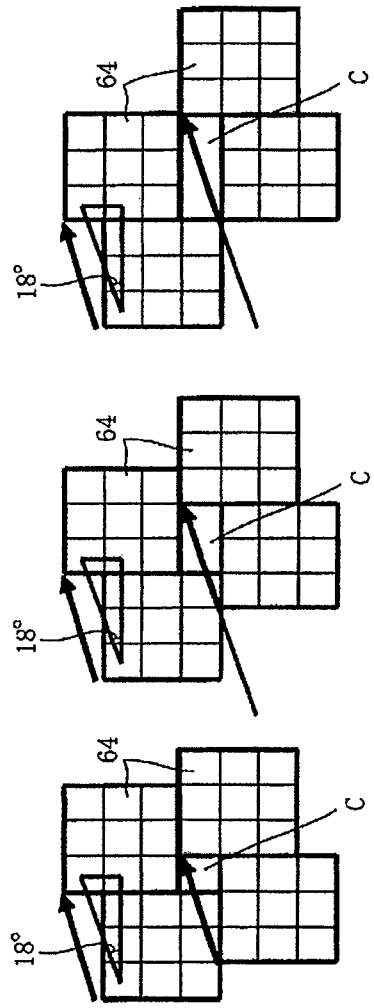
FIG. 13B is a drawing for explaining a relation between an arrangement of the sub-matrixes, a screen angle, and the number of screen lines.
Figure 13A:
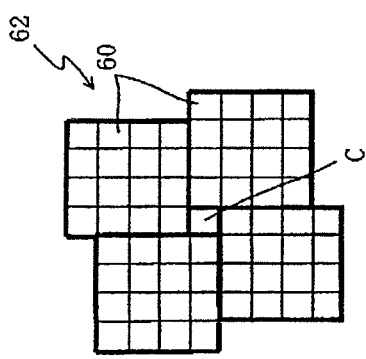
FIG. 13A is a drawing showing a basic unit configured as an assembly of the sub-matrixes having 4×4 elements.

FIG. 13A is a drawing showing a basic unit 62 including four sub-matrixes 60 each having 4×4 elements. With the arrangement of sub-matrixes 60 as shown in FIG. 13A, the screen angle θ of about 14°, and the number of screen lines of about 145 lpi are achieved.

As a matter of course, the screen angle θ and the number of screen lines can be changed as needed by configuring the basic unit by differentiating the size or the arrangement of the sub-matrixes.

FIG. 13B shows an example in which the inter-sub-matrix cell C which corresponds to one element in the vertical direction is interposed between the sub-matrixes 64 of 3×3. In this case, the screen angle θ always becomes about 18°. Also, by increasing and decreasing the number of elements in the inter-sub-matrix cell C in the lateral direction, the number of screen lines can be changed as needed.

In the same manner, FIG. 13C shows an example in which the inter-sub-matrix cell C which corresponds to one element in the lateral direction is interposed between a pair of the sub-matrixes 64 of 3×3. In this case, the screen angle θ always becomes about 72°. Also, by increasing and decreasing the number of elements in the inter-sub-matrix cell C in the vertical direction, the number of screen lines can be changed as needed.

Figure 14A:
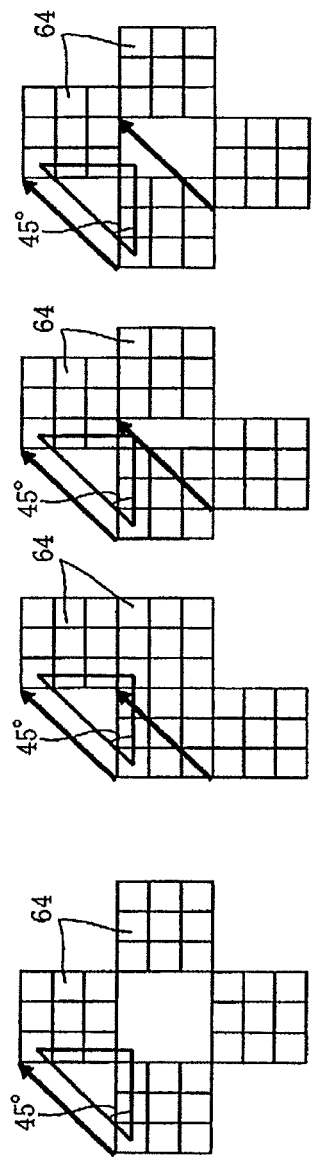
FIG. 14A is a drawing showing a relation between the arrangement of the sub-matrixes and a screen angle θ.
Figure 14B:
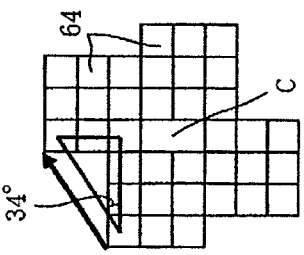
FIG. 14B is a drawing showing the relation between the arrangement of the sub-matrixes and the screen angle θ.
Figure 14C:
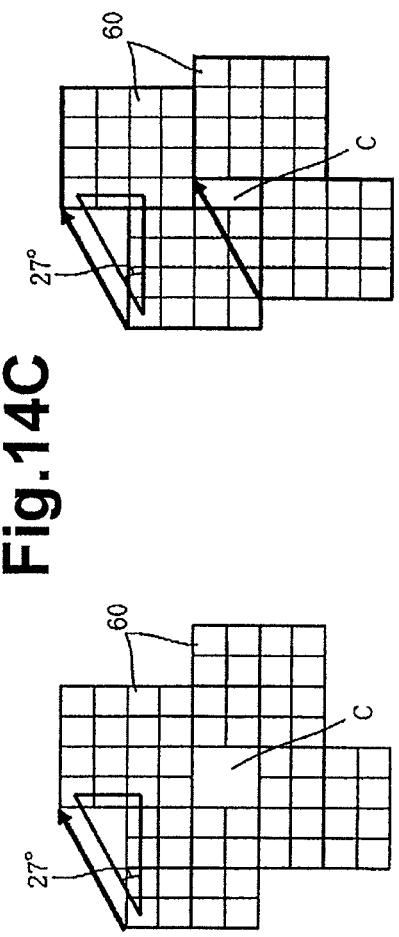
FIG. 14C is a drawing showing the relation between the arrangement of the sub-matrixes and the screen angle θ.

Referring now to FIGS. 14A, 14B and 14C, the relation between the arrangement of the sub-matrixes and the screen angle θ will further be described. FIG. 14A is a drawing showing an example of arrangement of the sub-matrixes for forming a screen angle of about 34°. As shown in FIG. 14A, by arranging the inter-sub-matrix cell C which corresponds to two elements in the vertical direction and one element in the lateral direction so as to be interposed between the sub-matrixes 64 of 3×3, the screen angle of about 34° is achieved.

FIG. 14B is a drawing explaining an example of arrangement of the sub-matrixes for forming a screen angle θ of 45°. As shown in FIG. 14B, by arranging the sub-matrixes 64 of 3×3 so as to be shifted by three elements in the lateral direction and three elements in the vertical direction, the basic unit for forming the screen angle of 45° is configured. By arranging the sub-matrixes of n×n by shifting in the lateral direction and the vertical direction by n elements respectively, the screen angle θ of 45° is achieved in the same manner.

FIG. 14C shows an example in which the inter-sub-matrix cell C which corresponds to two elements in the vertical direction is interposed between the sub-matrixes 60 of 4×4. With the arrangement of the sub-matrixes 60 as shown in FIG. 14C, the screen angle θ of about 27° is achieved.

As described with reference to FIGS. 13A, 13B and 13C and FIGS. 14A, 14B and 14C, by adjusting the size and arrangement of the sub-matrixes, adjustment of the screen angle θ and the number of screen lines to desired values is achieved.

Figure 15A:
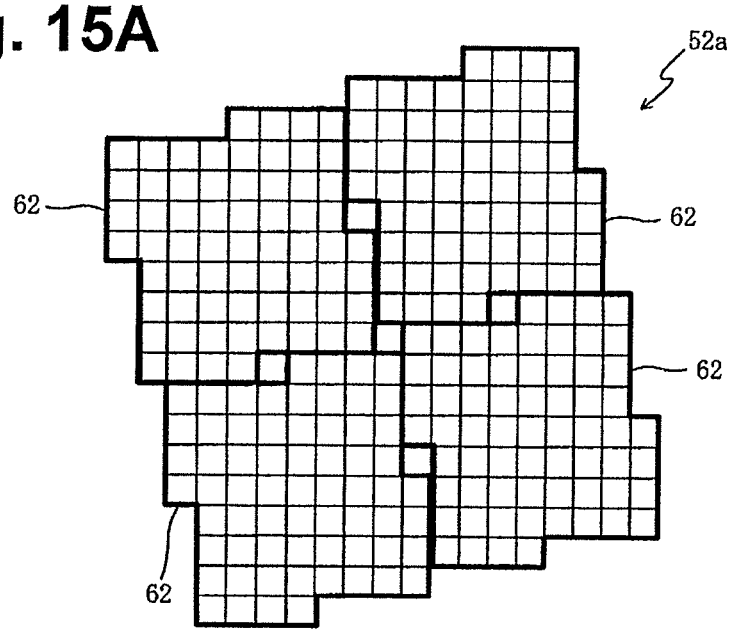
FIG. 15A is a drawing showing a relation between the basic unit and the dither matrix configured as an assembly of the basic unit.

FIG. 15A is a drawing showing a relationship between the basic units 62 and the dither matrix 52a configured as an assembly of the basic units 62. Here, the number of elements in the dither matrix 52a is equal to the number of tones which is expressible within the range that the dither matrix 52a covers. Therefore, the number of the basic units 62 which constitute the dither matrix 52a is calculated on the basis of the desired number of tones which are to be expressed by the dither matrix 52a and the number of elements in the basic unit 62. For example, when the number of tones to be expressed in the dither matrix 52a is 256 tones, and the number of elements in the single basic unit 62 is sixty five, it is understood that the single dither matrix 52a can be configured by four basic units 62 (that is, sixteen sub-matrixes 60).

Figure 15B:
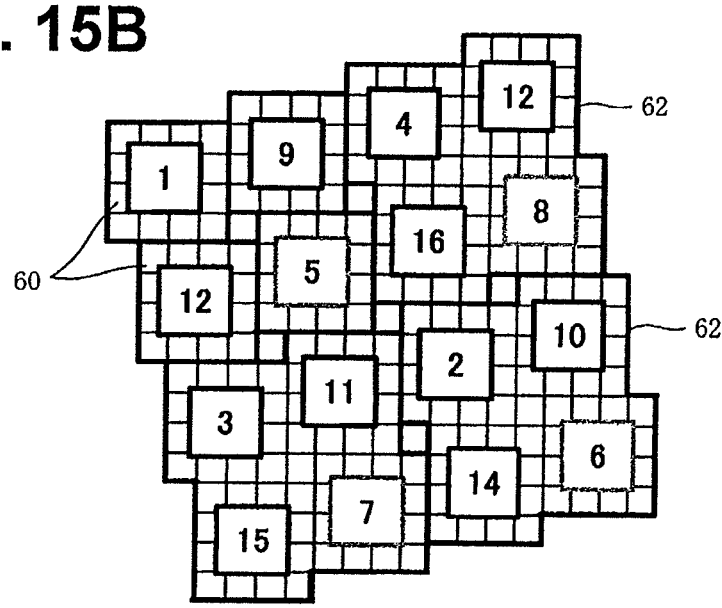
FIG. 15B is a drawing showing an example of smallest threshold values to be allocated to the respective sub-matrixes.

Subsequently, values from 1 to 16 are allocated as the smallest threshold values to the respective sub-matrixes 60. FIG. 15B is a drawing showing an example of the smallest threshold values to be allocated to the respective sub-matrixes 60. The smallest threshold values allocated here are provisional smallest threshold values allocated temporarily in order to allocate the threshold values of 256 tones to the dither matrix 52a uniformly.

Figure 16:
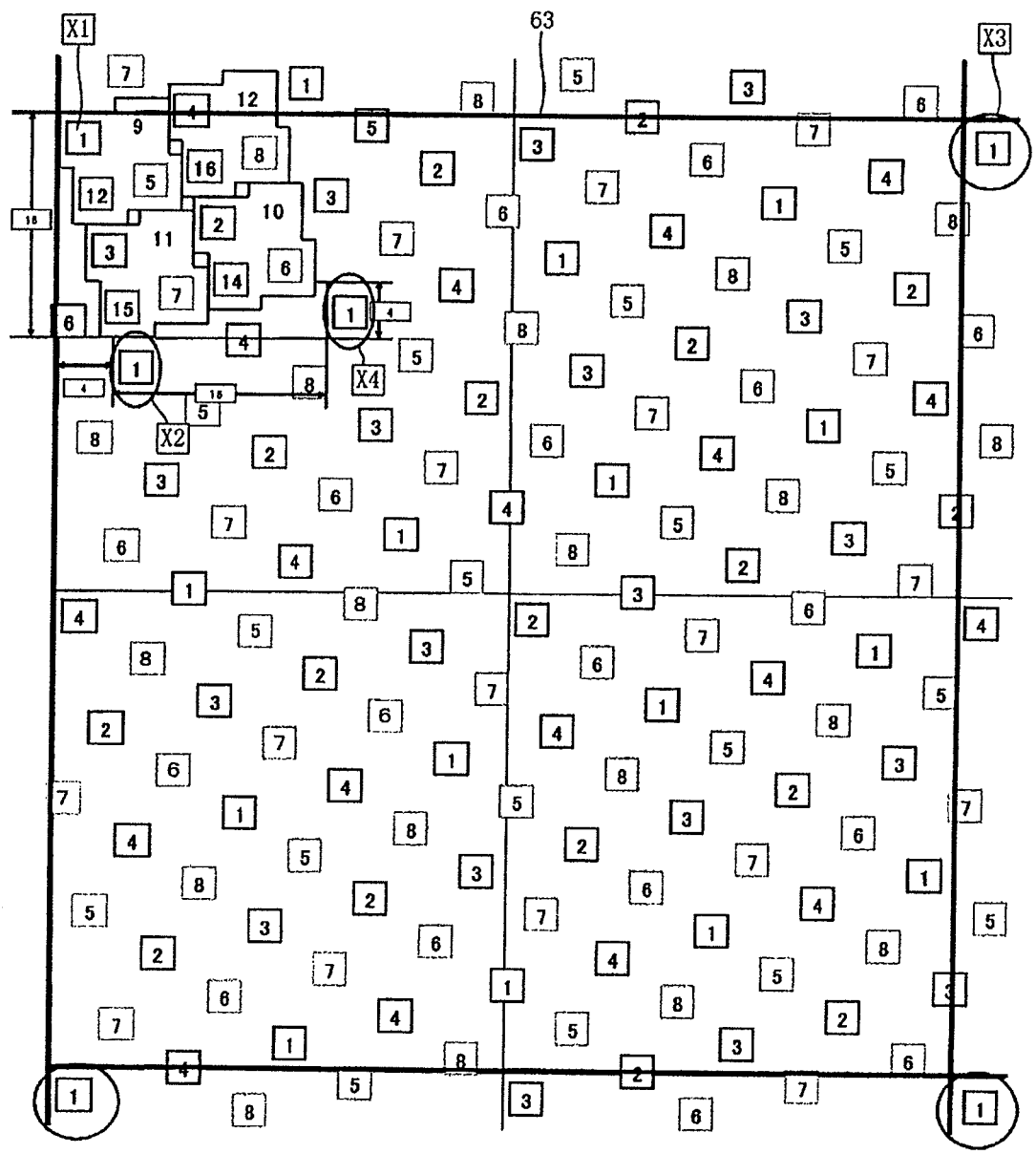
FIG. 16 is a drawing for explaining a method of determining the size of a large dither.

Subsequently, as shown in FIG. 16, the size of a large dither 63 configured of an assembly of the dither matrixes 52a is determined. More specifically, spots where the same smallest threshold values are generated at the same position in the lateral direction and at the same position in the vertical direction are searched, and a size covering a range to the corresponding spots is determined as the size of the large dither 63. For example, as shown in FIG. 16, a spot X1 where the smallest threshold value "1" is generated is determined as an apex, and a size defined by a spot X3 which is located at the same position in the vertical direction as the spot X1 and where the same smallest threshold value "1" is generated and a spot X5 which is located at the same position in the lateral direction as the spot X1 and where the same smallest threshold value "1" is generated is determined as the size of the large dither 63.

A procedure to calculate the distance from the spot X1 to the spot X3 and the distance from the spot X1 to the spot X5 (that is, the size of the large dither 63) will be described below. First of all, a spot X2 where the same smallest threshold value "1" as the spot X1 is generated is searched. In the example shown in FIGS. 15A and 15B, the distance between the spot X1 and the spot X2 is apart from each other by an extent corresponding to sixteen threshold values in the vertical direction and is apart from each other by an extent corresponding to four threshold values in the lateral direction. Also, a range from the spot X2 to a spot X4 where the same smallest threshold value "1" is generated corresponds to sixteen threshold values in the lateral direction and to four threshold values in the vertical direction.

Therefore, from an expression 16÷4=4, it is understood that four dither matrixes 52a can be arranged in a range from the spot X3 to the spot X2. Therefore, the number of threshold values to be arranged in the lateral direction from the spot X2 to the spot X3 is calculated as sixty four from an expression 16×4=64.

The spot X1 and the spot X2 are apart from each other in the lateral direction by an extent corresponding to four threshold values. Therefore, from an expression 64+4=68, the number of the threshold values included in a range from the spot X1 to the spot X3 (that is, the lateral size of the large dither 63) can be calculated as sixty eight threshold values. In the same manner, the number of the threshold values included in a range from the spot X1 to the spot X5 (that is, the vertical size of the large dither) can be calculated.

The dither matrixes designed by the process described later are stored in the ROM 52 (see FIG. 3) in the unit of the large dither determined in this manner.

Subsequently, the shape of the dots to be formed corresponding to the respective sub-matrixes 60 is selected. As the dot shape, there are "circle", "oval", "square", and "diamond shape" in detail, and the dot shape which meets the application or the resolution may be selected. Here, description will be made assuming that the rod-like dot shape which is suitable for the laser printer 1 is selected.

Figures 17A, 17B:
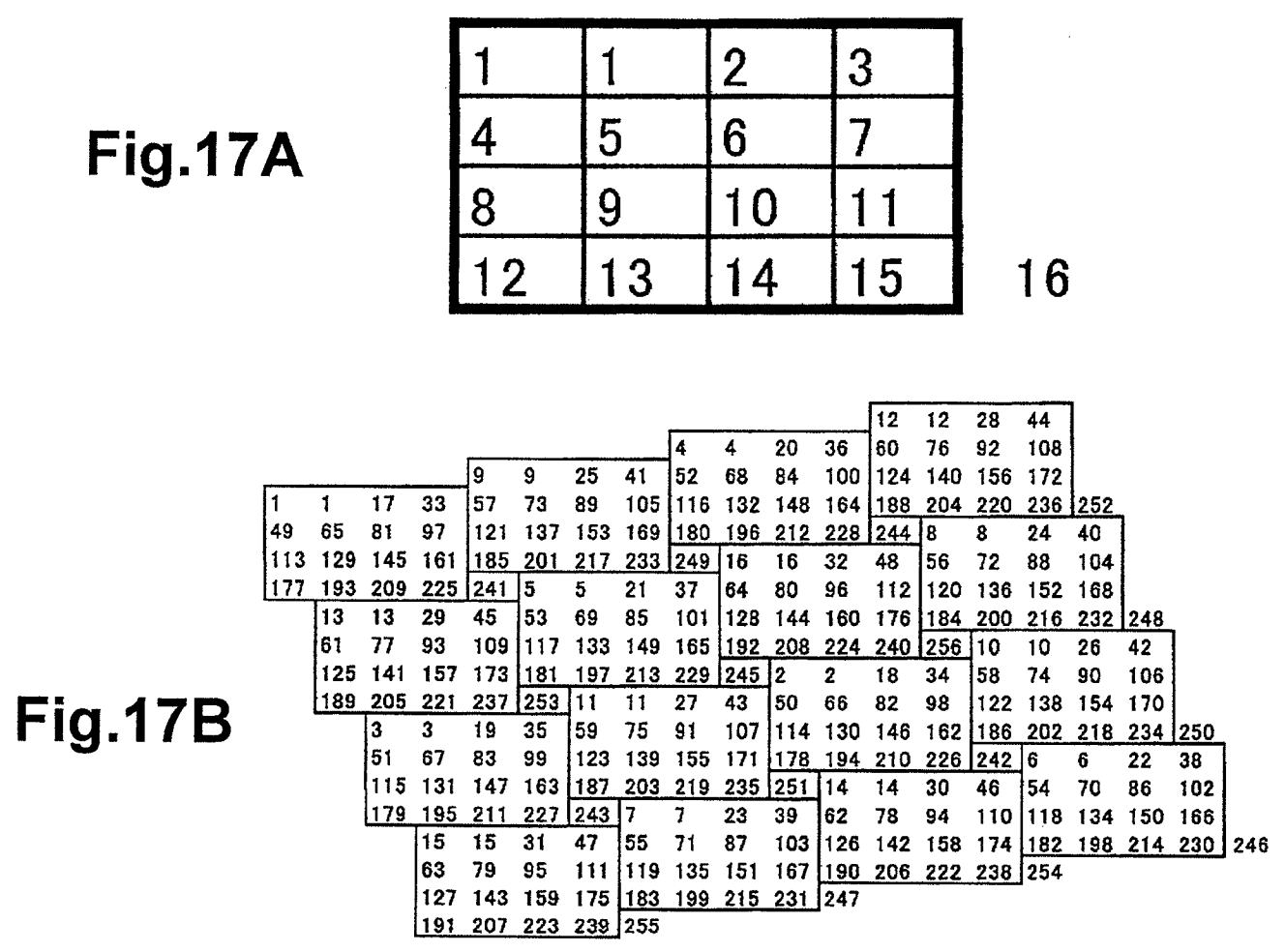

FIG. 17A is a drawing showing an example of a sequence of growth of the dot for forming the rod-like dot parallel to the primary scanning direction. As shown in FIG. 7A, the sub-matrixes 60 and the inter-sub-matrix cell C which assume the desired dot shape can be designed by designing the sub-matrixes 60 and the inter-sub-matrix cell C in such a manner that the larger the sequence of growth of the dot, the larger the threshold value to be allocated becomes, that is, by allocating the threshold values in an ascending order according to the sequence of growth of the dot.

As shown in FIG. 17A, when determining the sequence of growth of the dot, the dot formed corresponding to the sub-matrix 60 is formed into the rod-like dot shape by extending from a position corresponding to the upper left corner of the sub-matrix 60 as an original point in the primary scanning direction.

FIG. 17B is a drawing showing an example of the threshold values allocated to the dither matrix 52a according to the smallest threshold value shown in FIG. 15B and the sequence of growth of the dot shown in FIG. 17A. The smallest threshold value allocated as shown in FIG. 15B is arranged at the upper left corner of the sub-matrix 60, and the threshold values are arranged by adding the smallest threshold value by "16" in the sequence of growth of the dot shown in FIG. 17A (see FIG. 17B). Accordingly, the threshold values from 1 to 256 can be allocated dispersedly. Subsequently, the threshold values arranged in the dither matrix 52a in this manner are fine-adjusted.

Figures 18A, 18B:
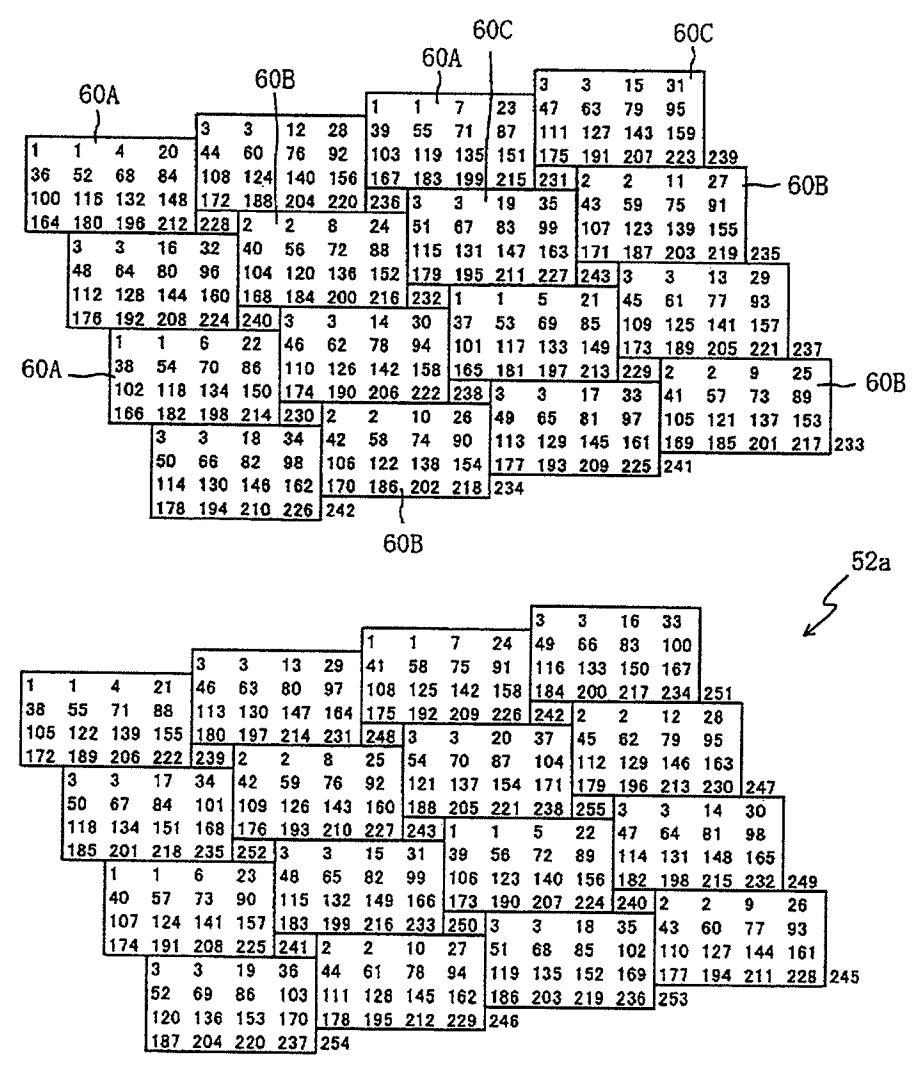

FIGS. 18A and 18B are drawings explaining examples of adjustment of the threshold values arranged in the dither matrix 52a. For example, when a feature such that the toner can hardly be fixed is observed in the laser printer 1, the pixels to be adhered with the toner can be increased by reducing the threshold values to be arranged in the dither matrix 52a, so that the dots having an adequate size can be formed even when the toner can hardly be fixed.

Therefore, as shown in FIG. 18A, the provisional smallest threshold values "1, 2, 3, 4" allocated initially to the sub-matrixes are changed to "1" (sub-matrix 60A). In the same manner, the provisional smallest threshold values "5, 6, 7, 8" allocated initially to the sub-matrixes are changed to "2" (sub-matrix 60B). In the same manner, the provisional smallest threshold values "9, 10, 11, 12, 13, 14, 15, 16" allocated initially to the sub-matrixes are changed to "3" (sub-matrix 60C). Subsequently, the threshold values from "4" to "19" as the second smallest threshold values from the smallest threshold values "1, 2, 3" after the change are allocated to immediate right of the smallest threshold value respectively in any sub-matrix. Then, with reference to the allocated threshold values from "4" to "19", the remaining threshold values in the respective sub-matrixes 60 are set to values with the increment of 16, so that the threshold values in the sub-matrix 60 are reset.

As shown in FIG. 18A, when the threshold values in the respective sub-matrixes 60 are changed, a largest value of the threshold value in the dither matrix 52a is smaller than 255. For example, in the case of FIG. 18A, the largest threshold value is 243. In this case, the values of all the pixels within the range that the dither matrix covers are converted into "1" which means that the toner is fixed at the time point of the input value 243, so that the tone from the input value 243 to the input value 255 cannot be expressed.

Therefore, as shown in FIG. 18B, the threshold values are adjusted so that the largest value among all the threshold values in the dither matrix 52a becomes 255. More specifically, the calculation of "threshold value×255÷(the largest threshold value at the time point of FIG. 18A)", if for example, the largest threshold value at the time point of FIG. 18A is 243, the calculation of the "threshold value×255÷243" is performed for all the threshold values so that the threshold values to 255 are allocated evenly. Values after the decimal point of the result of calculation are rounded off. In this manner, as a result of adjustment of the largest value of the threshold values, for example, if any threshold value becomes zero, or an irregularity such that the threshold value next to the threshold value 20 becomes 27 is generated, so that inconvenience such that a smooth tone expression cannot be achieved is resulted, an operator who is in charge of creating the dither matrix 52a may return to any part of the procedure shown in FIGS. 13A, 13B, and 13C to FIGS. 18A and 18B and retry the operation again.

The created dither matrix 52a is stored in the ROM 52 (see FIG. 3) in the unit of the large dither 63 determined in FIG. 16. Accordingly, in the halftoning, a range corresponding to a plurality of the dither matrixes 52a can be processed at once by superimposing the large dither 63 on the input image and performing the comparison with the threshold values.

The dither matrixes from Pattern 1 to Pattern 6 described with reference to FIGS. 6A and 6B to FIG. 11 can be designed in the same procedure.

In this embodiment, description has been made assuming that the laser printer 1 stores the dither matrixes 52a, and the halftoning is performed in the laser printer 1. In contrast, it is also possible to configure in such a manner that the halftoning is performed in the external data processing instrument such as the personal computer and the image data is outputted into the laser printer.

Figure 19:
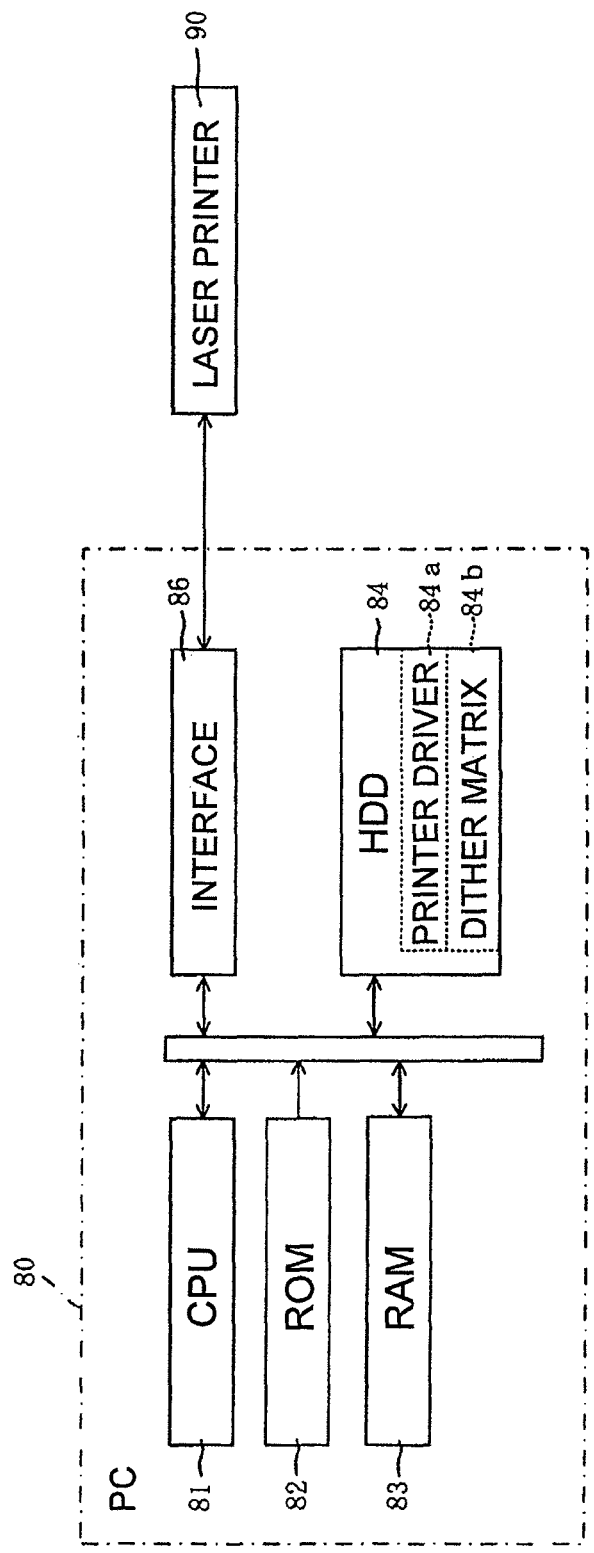
FIG. 19 is a block diagram showing an electric configuration between a PC and a laser printer connected to the PC so as to allow the communication therewith.

FIG. 19 is a block diagram showing an electric configuration of a personal computer 80 (hereinafter referred to as PC 80), and a laser printer 90 connected to the PC 80 so as to allow the communication therewith. The laser printer 90 comprises a photoconductor drum, a laser scanner apparatus configured to scan the photoconductor drum in the primary scanning direction according to the image data, a drum gear configured to transmit a drive force from the drive source to the photoconductor drum, and a drum driving gear. The configurations of the photoconductor drum, the laser scanner apparatus, the drum gear, and the drum driving gear may be the same configuration as those of the laser printer 1 described in the embodiment, detailed illustration and description are omitted.

The PC 80 comprises a CPU 81, a ROM 82, a RAM 83, an HDD (hard disk drive) 84, and an interface 86 for connecting with the laser printer 90.

As shown in FIG. 19, the HDD 84 stores a printer driver 84a and a dither matrix 84b used for the halftoning. The CPU 81 functions as image data generating unit configured to generate image data by performing the halftoning using the dither matrix 84b according to the printer driver 84a.

The dither matrix 84b is configured to include a plurality of the sub-matrixes having the threshold values set in such a manner that the dot grows into the rod-like shape from the original point in the primary scanning direction as in the case of the dither matrix 52a in the embodiment arranged regularly.

In this case as well, the generation of the interference fringes on the printing paper is restrained by configuring in such a manner that the gear pitch a determined on the basis of the configuration of the laser printer 90 and the line pitch b determined on the basis of the dither matrix stored in the PC 80 satisfy the relational expression; $a \geq 0.08$ mm and $b/a < 0.80$, or $a < 0.08$ mm and $b/a > 1.27$, in the same manner as the laser printer 1 in the embodiment.

Although the number of colors used in the laser printer 1 is assumed to be one in the description in the embodiment described above, a color laser printer which forms images with toner in a plurality of colors may be applicable. When the image is formed with the toner in the plurality of colors, the dither matrixes to be applied are differentiated on the color-to-color basis, and the screen angles are differentiated on the color-to-color basis. In this case as well, the generation of the interference fringes on the printing paper may be reduced or restrained by configuring in such a manner that the line pitch b and the gear pitch a determined from the dither matrixes in respective colors respectively satisfy the relational expression; $a \geq 0.08$ mm and $b/a < 0.80$, or $a < 0.08$ mm and $b/a > 1.27$, in the same manner as the laser printer 1 in the embodiment.

While the invention has been described in connection with embodiments, it will be understood by those skilled in the art that other variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

What is claimed is:

1. An image forming apparatus comprising:
an image data generating unit configured to convert a tone of an input value which indicates a density of a pixel by using a predetermined dither matrix and generate image data;
a scanning unit configured to scan an image carrier in a primary scanning direction according to the image data generated by the image data generating unit;
an image forming unit configured to form, on a printing medium, an image corresponding to the image data scanned by the scanning unit;
a drive source; and
a gear configured to transmit a drive force from the drive source to the image carrier,
wherein the dither matrix includes a plurality of sub-matrixes arranged in a predetermined rule and each of the plurality of sub-matrix having predetermined threshold values such that a dot in each of the plurality of the sub-matrixes grows from a corresponding original point,
wherein the image forming apparatus satisfies a relation of
(1) $a \geq 0.08$ mm and $b/a < 0.80$, or
(2) $a < 0.08$ mm and $b/a > 1.27$
where "a" is a travel distance of a printing medium per tooth of the gear in a secondary scanning direction orthogonal to the primary scanning direction, and
"b" is a distance between the corresponding original points of a pair of the dots formed on the printing medium apart from each other in the secondary scanning direction on the basis of a pair of the sub-matrixes adjacent to each other in the primary scanning direction in the dither matrix.

2. The image forming apparatus according to claim 1, wherein the sub-matrix includes the threshold values set in such a manner that the dot formed at the original point extends in the primary scanning direction as the densities of the pixel increase to form a rod-like dot shape, and the rod-like dot is increased in thickness in the secondary scanning direction as the density further increases.

3. The image forming apparatus according to claim 1, wherein the image forming apparatus satisfies the relation of (1) $a \geq 0.08$ mm and $b/a < 0.80$.

4. The image forming apparatus according to claim 1, wherein the image forming apparatus satisfies the relation of (2) $a < 0.08$ mm and $b/a > 1.27$.

5. An image forming system comprising:
an image forming apparatus comprising:
a scanning unit configured to scan an image carrier in a primary scanning direction according to image data;
an image forming unit configured to form, on a printing medium, an image corresponding to the image data scanned by the scanning unit;
a drive source; and
a gear configured to transmit a drive force from the drive source to the image carrier; and
a computer which communicate with the image forming apparatus, the computer comprises an image data generating unit configured to convert an input value which indicates a density of a pixel by using a predetermined dither matrix and generate image data,
the dither matrix includes a plurality of sub-matrixes arranged in a predetermined rule, each of the plurality of sub-matrix having predetermined threshold values such that a dot in each of the plurality of the sub-matrixes grows from a corresponding original point, wherein the image forming apparatus satisfies a relation of
(1) a≧0.08 mm and b/a<0.80, or
(2) a<0.08 mm and b/a>1.27
where "a" is a travel distance of a printing medium per tooth of the gear in a secondary scanning direction orthogonal to the primary scanning direction, and "b" is a distance between the corresponding original points of a pair of the dots formed on the printing medium apart from each other in the secondary scanning direction on the basis of a pair of the sub-matrixes adjacent to each other in the primary scanning direction in the dither matrix.

6. The image forming system according to claim 5, wherein the sub-matrix includes the threshold values set in such a manner that the dot formed at the original point extends in the primary scanning direction as the densities of the pixel increase to form a rod-like dot shape, and the rod-like dot is increased in thickness in the secondary scanning direction as the density further increases.

7. The image forming system according to claim 5, wherein the image forming system satisfies the relation of (1) a≧0.08 mm and b/a<0.80.

8. The image forming system according to claim 5, wherein the image forming system satisfies the relation of (2) a<0.08 mm and b/a>1.27.

* * * * *